United States Patent
Sekino et al.

(10) Patent No.: US 9,701,262 B2
(45) Date of Patent: Jul. 11, 2017

(54) HARNESS BENDING REGULATION MEMBER AND HARNESS ROUTING STRUCTURE USING THE SAME

(71) Applicant: Yazaki Corporation, Tokyo (JP)

(72) Inventors: Tsukasa Sekino, Makinohara (JP); Hiroshi Yamashita, Makinohara (JP); Daisuke Okamoto, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 15/062,718

(22) Filed: Mar. 7, 2016

(65) Prior Publication Data
US 2016/0185308 A1 Jun. 30, 2016

Related U.S. Application Data

(63) Continuation of application No. PCT/JP2014/076803, filed on Oct. 7, 2014.

(30) Foreign Application Priority Data

Oct. 11, 2013 (JP) .................................. 2013-214078
Oct. 11, 2013 (JP) .................................. 2013-214079

(51) Int. Cl.
*B60R 16/02* (2006.01)
*H01B 7/00* (2006.01)
(Continued)

(52) U.S. Cl.
CPC ........ *B60R 16/0215* (2013.01); *B60R 16/027* (2013.01); *H01B 7/0045* (2013.01);
(Continued)

(58) Field of Classification Search
CPC ............ B60R 16/0215; B60R 16/0207; H01B 7/0045; F16L 7/00; F16L 3/26; H02G 3/04; H02G 3/0462; H02G 3/0468
(Continued)

(56) References Cited

U.S. PATENT DOCUMENTS 5,661,453 A * 8/1997 Justus ................. B60R 16/0215
340/438
7,952,032 B2 * 5/2011 Suzuki ............... B60R 16/0222
16/2.1
(Continued)

FOREIGN PATENT DOCUMENTS

JP 6-84726 U 12/1994
JP H11309578 A 11/1999
(Continued)

OTHER PUBLICATIONS

International Search Report mailed Dec. 16, 2014, issued for PCT/JP2014/076803.
(Continued)

*Primary Examiner* — Dimary Lopez Cruz
(74) *Attorney, Agent, or Firm* — Locke Lord LLP

(57) ABSTRACT

Provided is a harness bending regulation member to be attached to a flexible harness protective tube, including: a high rigid unbendable portion into which an electric wire is inserted; and a bendable portion projecting in an axial direction of the unbendable portion from a tip end of one side of the unbendable portion, the bendable portion regulating a bending of the harness protective tube in a curved shape. The harness protective tube is routed from an oscillating member on a side close to a fixing structure to another oscillating member closer to a slide structure, the harness bending regulation member is placed inside of a harness holding tube on the side of the fixing structure, and the bendable portion is placed toward the slide structure along an inner surface of the harness protective tube.

10 Claims, 11 Drawing Sheets

(51) Int. Cl.
*H01B 7/04* (2006.01)
*H02G 11/00* (2006.01)
*B60R 16/027* (2006.01)
*H01B 7/18* (2006.01)
*H02G 3/04* (2006.01)
*H02G 3/06* (2006.01)

(52) U.S. Cl.
CPC ......... *H01B 7/1845* (2013.01); *H02G 11/006* (2013.01); *H02G 3/0406* (2013.01); *H02G 3/0468* (2013.01); *H02G 3/0691* (2013.01)

(58) Field of Classification Search
USPC ................. 174/68.3, 72 A, 70 R, 72 R, 71 R
See application file for complete search history.

(56) References Cited

U.S. PATENT DOCUMENTS

| | | | | |
|---|---|---|---|---|
| 8,070,212 | B2* | 12/2011 | Shima | B60R 16/0207 296/146.9 |
| 8,420,943 | B1* | 4/2013 | La | B60R 16/0222 16/2.1 |
| 8,648,259 | B2* | 2/2014 | Gniewek | H02G 3/0468 16/2.1 |
| 2006/0267380 | A1 | 11/2006 | Gotou et al. | |
| 2009/0000682 | A1 | 1/2009 | Kisu et al. | |
| 2014/0076628 | A1* | 3/2014 | McGrath | H01B 7/0045 174/84 R |

FOREIGN PATENT DOCUMENTS

| | | |
|---|---|---|
| JP | 2006-192939 A | 7/2006 |
| JP | 2006-327328 A | 12/2006 |
| JP | 2007-209120 A | 8/2007 |
| JP | 2008-149871 A | 7/2008 |
| JP | 2009-011136 A | 1/2009 |

OTHER PUBLICATIONS

Notification of Reasons for Refusal drafted on Mar. 31, 2017 issued for corresponding Japanese Patent Application No. 2013-214078.
Office Action drafted on Apr. 18, 2017 issued for corresponding Japanese Patent Application No. 2013-214079.

* cited by examiner

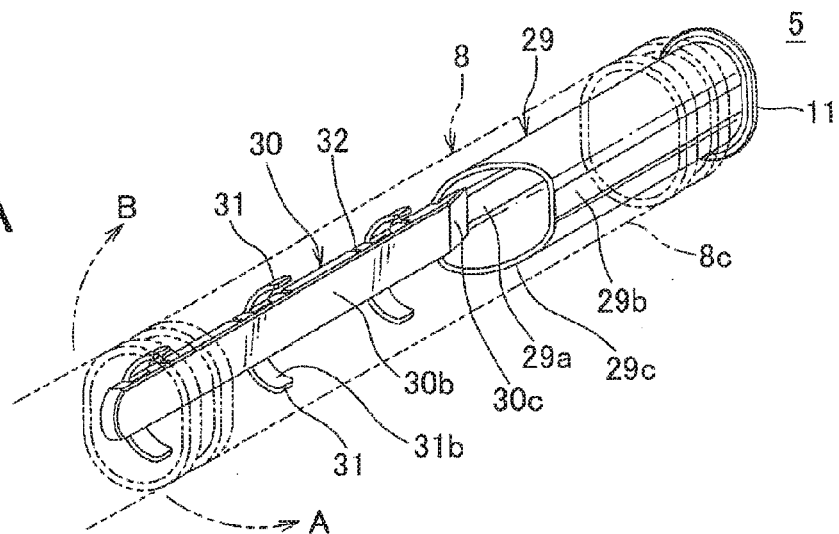
FIG. 5A
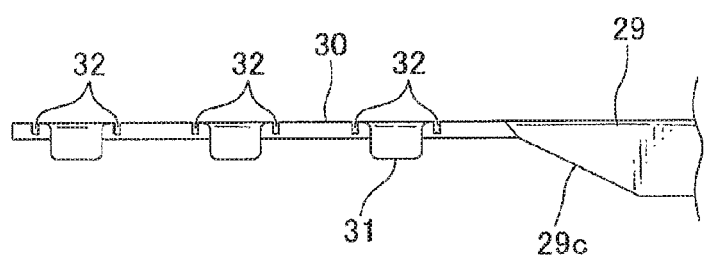
FIG. 5B
FIG. 6
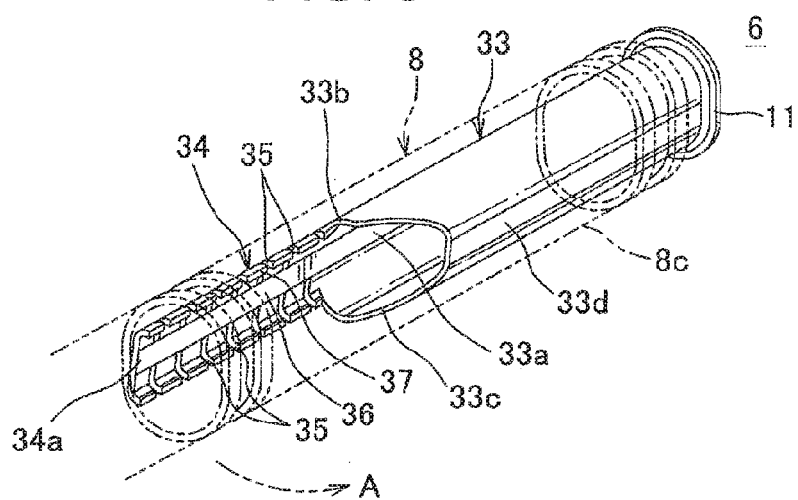

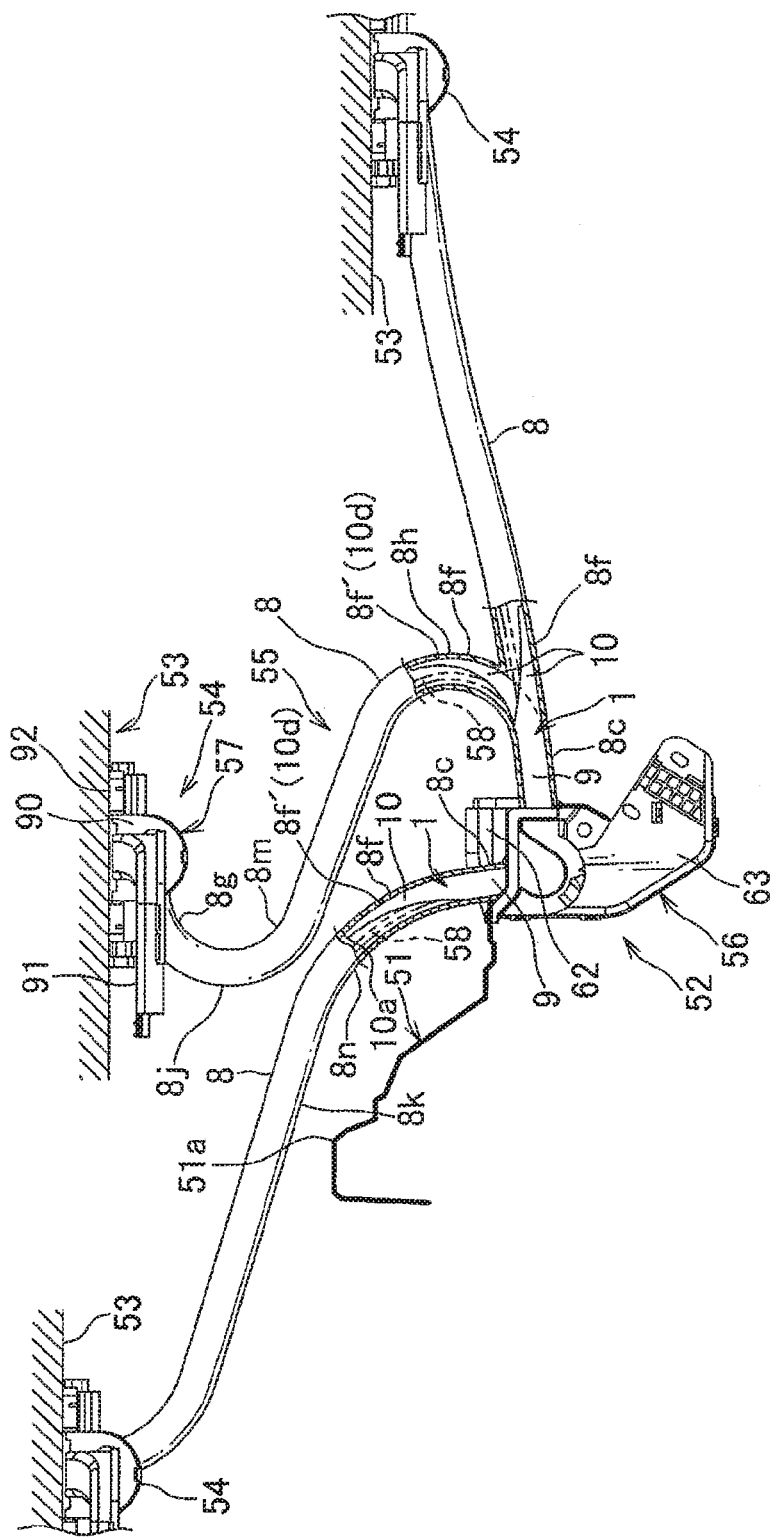

HARNESS BENDING REGULATION MEMBER AND HARNESS ROUTING STRUCTURE USING THE SAME

TECHNICAL FIELD

The present invention relates to a harness bending regulation member and a harness routing structure using the same for regulating the bending of a protective tube such as a corrugated tube of a wire harness routed in a slide door from a vehicle body of a car for example.

BACKGROUND ART

To enhance partial rigidity of a synthetic resin corrugated tube which is a protective tube of a wire harness routed in a car or the like, there are conventionally proposed various corrugated tube structures. There are also proposed various harness routing structures in which a wire harness having a corrugated tube is horizontally routed from a vehicle body of a car to a slide door, and when the slide door is opened or closed, the wire harness having the corrugated tube is bent in a door-opening/closing direction between the vehicle body and the slide door.

For example, it is described in Patent Literature 1 that a slider having a substantially U-shaped vertical cross section is placed on the side of a slide door, an oscillating member is provided on the slider such that the oscillating member can oscillate in a longitudinal direction (horizontal direction) of a vehicle, the oscillating member is made to hold one of ends of a synthetic resin corrugated tube on an outer periphery of a wire harness, and reinforcing ribs in a longitudinal direction of the tube are provided on upper and lower portions of the corrugated tube, thereby preventing the wire harness from hanging down.

The corrugated tube alternately includes concave grooves and convex projections in the longitudinal direction of the tube. The concave grooves and the convex projections are arranged in a circumferential direction of the tube. The concave groove in the one end of the corrugated tube is engaged with the convex projection in a hole of the oscillating member and is held such that the convex projection is not pulled out. The other end of the corrugated tube is similarly held by a harness fixing portion on the side of the vehicle body. The wire harness is formed by inserting a plurality of electric wires into the corrugated tube.

Patent Literature 2 describes that ribs (convex portions and concave portions) are provided on right and left side surfaces of a corrugated tube instead of upper and lower portions of the tube. The ribs (convex portions and concave portions) extend in a longitudinal direction of the corrugated tube.

Patent Literature 3 describes that in order to strongly fix an end of a corrugated tube to an end of a protector when the corrugated tube on an outer periphery of a wire harness routed in a vehicle is inserted into a substantially cylindrical protector instead of supplying electricity to a slide door and a cylindrical portion of the end of the protector is inserted into an inner side of the end of the corrugated tube, a halved annular fixing member is fitted over an outer side of the end of the corrugated tube, and the cylindrical portion and the fixing member sandwich the end of the corrugated tube.

CITATION LIST

Patent Literatures

Patent Literature 1: JP 2009-11136 A (FIGS. 4 to 5)
Patent Literature 2: JP 2006-192939 A (FIGS. 1 to 2)
Patent Literature 3: JP 6-84726 Y (FIGS. 1 to 2)

SUMMARY OF INVENTION

Technical Problem

In the structure described in Patent Literature 1, however, the upper and lower ribs of the corrugated tube only prevent the wire harness between the slide door and the vehicle body from hanging down in mid-course of opening and closing operation of the slide door, and there is concern that bending movement (mode) of the corrugated tube (wire harness) in the door-opening/closing direction is varied, or the corrugated tube and the vehicle body may interfere with each other. In the structure described in Patent Literature 2, there is concern that since the ribs are formed over the entire length of the corrugated tube, costs of the corrugated tube may increase.

Generally, as occupancy of the plurality of electric wires in the protective tube is higher, it is necessary to largely secure a bending radius of the wire harness. When the occupancy of the plurality of electric wires in the protective tube is low and rigidity of the protective tube is high, the protective tube itself is prone to buckle. The above-described concerns are not limited to a slide door of a car and can also be applied to supply of electricity to a slide door of a vehicle other than a car and a slide door and the like such as of a device other than a vehicle. These slide doors are collectively called slide structures, and the vehicle bodies are collectively called fixing structures.

In the structure described in Patent Literature 3, since the cylindrical portion of the protector and the fixing member sandwich the end of the corrugated tube, when the corrugated tube is made to swing in a bending direction, there is concern that excessive stress is applied to the corrugated tube in the cylindrical portion and the end of the fixing member, and the corrugated tube is damaged.

In view of the above-described points, it is an object of the present invention to provide a harness bending regulation member capable of smoothly and reliably regulating the bending of the protective tube such as a corrugated tube of a wire harness without damaging the protective tube. It is another object of the invention to provide a harness routing structure using the harness bending regulation member capable of securing a minimum bending radius of a wire harness having a protective tube between a slide structure and a fixing structure, capable of smoothly bending the wire harness without buckling the same and capable of enhancing bending endurance of the wire harness, and capable of preventing interference between the protective tube and the fixing structure.

Solution to Problem

In order to achieve the object, according to a first aspect of the present invention, there is provided a harness bending regulation member to be attached to a flexible harness protective tube, and the harness bending regulation member includes: a high rigid unbendable portion into which an electric wire is inserted; and a bendable portion projecting in an axial direction of the harness bending regulation member from a tip end of one side of the unbendable portion, the bendable portion regulating a bending of the harness protective tube in a curved shape.

According to the above-described configuration, when a bending force is applied to the harness protective tube, the unbendable portion of the harness bending regulation member straightly maintains an end of the harness protective tube, and the bendable portion which is continuous with the unbendable portion supports a portion which is continuous with the end of the harness protective tube such that the latter portion can bend. The unbendable portion inhibits (regulates) the bending of the harness protective tube, and the harness protective tube is smoothly curved and bent at the bendable portion. Regulation of the bending of the harness protective tube by the bendable portion (regulation of bending radius) is facilitated by appropriately changing a shape of the bendable portion. For example, the unbendable portion is placed outside the electric wire, and the harness protective tube is placed outside the unbendable portion.

According to the harness bending regulation member of a second aspect, in the harness bending regulation member described in the first aspect, the bendable portion includes a plurality of slits or grooves arranged in parallel.

According to this configuration, firstly, if a larger number of the plurality of slits or grooves are placed on the tip end side of the bendable portion and a smaller number of the slits or grooves are placed on the base end, the tip end portion of the bendable portion can easily be bent with a smaller radius than the base end portion. Secondly, if opposed inner surfaces of the slits or grooves are abutted against each other when the bendable portion is bent, it is possible to prevent the bendable portion from further bending.

According to the harness bending regulation member of a third aspect, in the harness bending regulation member described in the second aspect, projections are provided on end edges of the slits or the grooves, and deviation between opposed inner surfaces of the slits or the grooves generated when the inner surfaces abut against each other is absorbed by the projections.

According to this configuration, even if the thickness of the bendable portion is thin, deviation between the opposed inner surfaces of the slits or grooves is absorbed by the projections projecting from the end edges of the slits or grooves (even if opposed inner surfaces of slits or grooves are slightly deviated from each other, opposed state is maintained) when the bendable portion is bent, the opposed inner surfaces of the slits or grooves abut against each other, and it is possible to restrain or prevent the bendable portion from further bending. According to this, regulation of the bending of the harness protective tube is reliably carried out.

According to a fourth aspect, there is provided a harness routing structure using the harness bending regulation member in which a harness protective tube is routed from an oscillating member on a side close to a fixing structure to another oscillating member on a side close to a slide structure, the harness bending regulation member according to any one of aspects is placed in a harness holding tube on the side of the fixing structure, and the bendable portion is placed toward the slide structure along the harness protective tube.

According to this configuration, when the slide structure is opened from its fully closed state for example, the harness bending regulation member maintains the harness protective tube on the side of the fixing structure substantially straightly to regulate the bending, and when the slide structure is halfway opened, the harness protective tube on the side of the fixing structure is supported by the bendable portion of the harness bending regulation member, a minimum bending radius is secured, the bending of the harness protective tube is regulated in a curved manner without being buckled or folded, and the harness protective tube is smoothly bent in a substantially S-shape between both the oscillating members.

When the slide structure is fully opened from its halfway opened state, the harness protective tube is pulled between both the oscillating members, the harness protective tube tries to extend and interfere with a portion of the fixing structure, but the harness protective tube on the side of the fixing structure is straightly restrained from bending by the unbendable portion of the harness bending regulation member and the harness protective tube projects in a thickness direction of the slide structure, thereby preventing the harness protective tube and the fixing structure from interfering with each other.

According to the harness routing structure using the harness bending regulation member of a fifth aspect, in the harness routing structure using the harness bending regulation member described in the fourth aspect, a flange on a side close to a base end of the unbendable portion is axially movably engaged with a groove of the oscillating member on the side of the fixing structure.

According to this configuration, when a tensile force or a compression force in an axial direction is applied to the harness bending regulation member by friction with respect to the protective tube at the time of bending of the harness protective tube for example, the flange of the harness bending regulation member moves forward and backward within the range of the groove of the oscillating member and absorbs the tensile force or the compression force. According to this, the regulation of the bending of the harness protective tube is smoothly carried out.

Advantageous Effects of Invention

According to the invention described in the first aspect, it is possible to smoothly bend the harness protective tube of the wire harness without folding the harness protective tube while regulating the bending of the harness protective tube of the wire harness by the unbendable portion of the harness bending regulation member and the bendable portion which is continuous with the unbendable portion. According to this, it is possible to smoothly and reliably regulate the bending of the harness protective tube without damaging the harness protective tube such as the corrugated tube.

According to the invention described in the second aspect, if the number and placement of the plurality of slits or grooves in the bendable portion are changed or the opposed inner surfaces of the slits or grooves can be abutted against each other, it is possible to desirably bend the bendable portion, i.e., the harness protective tube.

According to the invention described in the third aspect, if deviation between the opposed inner surfaces of the slits or grooves is absorbed when the bendable portion is bent, and the opposed inner surfaces of the slits or grooves are reliably made to abut against each other, it is possible to prevent the bendable portion from excessively bending, and to reliably regulate the bending of the harness protective tube.

According to the invention described in the fourth aspect, it is possible to secure the minimum bending radius of the wire harness having the harness protective tube between the slide structure and the fixing structure when the slide structure is halfway opened by the harness bending regulation member placed on the side of the fixing structure, and it is possible to smoothly regulate the bending the wire harness without buckling, to enhance the bending endurance of the wire harness, to prevent the harness protective tube and the fixing structure from interfering with each other when the slide structure is fully opened, and to always enhance the reliability of supply of electricity to the slide structure.

According to the invention described in the fifth aspect, even when a tensile force or a compression force in the axial direction caused by friction with respect to the harness protective tube is applied to the harness bending regulation member when the harness protective tube is bent, the flange of the harness bending regulation member moves forward and backward within the range of the groove of the oscillating member, and absorbs the tensile force and the compression force. According to this, it is possible to smoothly regulate the bending of the harness protective tube.

BRIEF DESCRIPTION OF DRAWINGS

FIGS. 4A and 4B illustrate a fourth embodiment of the harness bending regulation member, wherein FIG. 4A is a perspective view and FIG. 4B is a side view.

FIGS. 5A and 5B illustrate a fifth embodiment of the harness bending regulation member, wherein FIG. 5A is a perspective view and FIG. 5B is a plan view.

FIG. 6 is a perspective view illustrating a sixth embodiment of the harness bending regulation member.

FIGS. 7A to 7C illustrate a seventh embodiment of the harness bending regulation member, wherein FIG. 7A is a perspective view of an extended state, FIG. 7B is a plan view, and FIG. 7C is a perspective view of a bent state.

FIG. 8 is a plan view illustrating a first embodiment of a harness routing structure using the harness bending regulation member of the invention.

DESCRIPTION OF EMBODIMENTS

FIGS. 1 to 7 illustrate embodiments of a harness bending regulation member of the present invention.

Each of the harness bending regulation members 1 to 7 is inserted into a corrugated tube (protective tube) 8 made of synthetic resin. Each of the harness bending regulation members 1 to 7 is made of synthetic resin and has a cross section shape corresponding to the corrugated tube 8 having a long circular cross section. The corrugated tube 8 is an existing corrugated tube, and circumferential concave grooves 8a and convex projections 8b (FIG. 1) are alternately arranged in a longitudinal direction of the tube.

Figure 1:
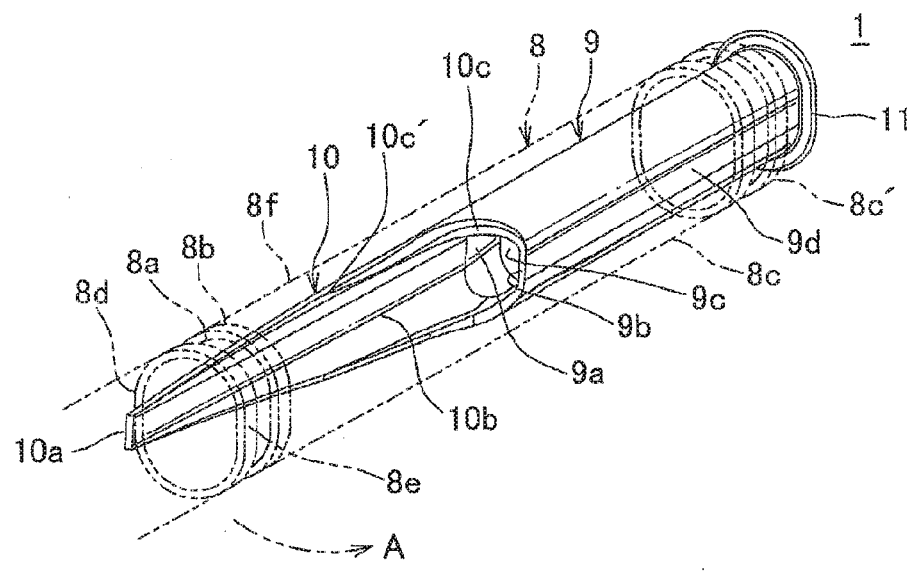
FIG. 1 is a perspective view of a first embodiment of a harness bending regulation member of the present invention.

The harness bending regulation member 1 illustrated in FIG. 1 includes a high rigid cylindrical portion (unbendable portion or high rigid portion) 9 having a long circular cross section, and a flexible spatulate portion (bendable portion or low rigid portion) 10 which integrally extends from a tip end 9b of the cylindrical portion 9 in one side (one side wall) 9a on a short-diameter side of the cylindrical portion 9 in an axial direction (longitudinal direction) of the harness bending regulation member 1. The spatulate portion 10 is substantially tapered toward the tip end 10a such that the spatulate portion 10 is gradually narrowed in width.

A flange 11 facing outward is integrally provided on a base end of the cylindrical portion (cylindrical wall) 9. The cylindrical portion 9 includes a hole 9c penetrating the cylindrical portion 9 in the axial direction so that a plurality of electric wires (not shown) of a wire harness are inserted, and the hole 9c includes openings on the side of the base end and on the side of the tip end.

Configurations of the cylindrical portion 9, the flange 11 of its base end thereof, the hole 9c penetrating the cylindrical portion 9, and its openings, and configurations in which the spatulate portion 10 or portions similar to the spatulate portion 10 extend on the one side 9a of a short-diameter side of the cylindrical portion 9 are in common in the embodiments illustrated in FIGS. 1 to 6 (in following embodiments illustrated in FIGS. 2 to 6, description of common portions will be omitted).

The spatulate portion 10 in FIG. 1 includes an outer peripheral surface (not shown) and an inner peripheral surface 10b having the same curved shapes as that of the one side 9a on the short-diameter side of the cylindrical portion 9. A base end portion of the spatulate portion 10 is continuous, in inclined manner (or curved manner), with one side 9a of a short-diameter side in a tip end portion 9b of the cylindrical portion 9 to surround the other end portion (other side wall) 9d. A tip end 10c' of an inclined portion 10c reaches an intermediate portion of the spatulate portion 10 in its longitudinal direction. Rigidity of an intermediate portion between the high rigid cylindrical portion 9 and the low rigid spatulate portion 10 is secured by the inclined portion 10c, and the spatulate portion 10 can smoothly bend (this effect is exerted also in other embodiments).

An outer peripheral surface of the spatulate portion 10 on the side of the base end is formed into a semi-annular shape of a wider shape than the semi-annular shape, an outer peripheral surface on the side of the intermediate portion is formed into a curved shape, and an outer peripheral surface on the side of the tip end is formed narrow substantially in terms of plane. The spatulate portion 10 is prone to bend with a smaller radius as approaching the tip end.

An outer diameter of the cylindrical portion 9 is set slightly smaller than an inner diameter of the corrugated tube 8 shown by chain lines, the bending regulation member 1 is inserted inside of the opening on the side of the one end portion 8c of the corrugated tube 8, and the flange 11 on the side of the base end is opposed to the base end 8c' of the corrugated tube 8 (this configuration is in common in embodiments illustrated in FIGS. 1 to 6). An outer peripheral surface of the cylindrical portion 9 comes into contact with an inner peripheral surface of the corrugated tube 8, and an outer peripheral surface of the spatulate portion 10 comes into contact with an inner peripheral surface of the one side 8d on the short-diameter side of the corrugated tube 8.

When a bending force is applied from the one side 8d on the short-diameter side toward the other end portion 8e as shown by an arrow A in the corrugated tube 8, the one end portion 8c of the corrugated tube 8 is supported by the cylindrical portion 9 of the bending regulation member 1, the one end portion 8c is restrained from bending, the one side 8d of an intermediate portion 8f in the longitudinal direction which is continuous with the one end portion 8c of the corrugated tube 8 is supported by the spatulate portion 10, and the one side 8d is gradually bent largely as approaching the tip end 10a of the spatulate portion 10.

That is, the tip end 10a of the spatulate portion 10 largely bends with a small radius, the intermediate portion of the spatulate portion 10 bends with an intermediate radius, and the base end 10c of the spatulate portion 10 bends small with a large radius. In accordance with this, the corrugated tube 8 also bends in a quadratic curve manner. The bending radius (bending angle) of the corrugated tube 8 is regulated by the spatulate portion 10 in this manner. The corrugated tube portion 8c on the outer peripheral side of the cylindrical portion 9 is restrained from bending by the high rigid cylindrical portion 9.

It is also possible to employ such a configuration that the cylindrical portion 9 is formed such that it can be divided in a short-diameter direction from a dividing surface (not shown) on the long-diameter side, and both the divided cylindrical portions are locked to and fixed to each other by lock means (not shown) such as a lock pawl and a lock recess. It is also possible to employ such a configuration that around one of the hinge (not shown) on the long-diameter side as a fulcrum, the other hinge is made such that it can open and close and both the divided cylindrical portions can be fixed to each other through lock means. In correspondence with a corrugated tube (not shown) having a circular cross section instead of the long circular cross section, the bending regulation member 1 can be composed of the cylindrical portion (9) having a circular cross section, the spatulate portion (10) having a curved shape same as the cylindrical portion (9) or a portion which is similar to the spatulate portion. A cross section of the cylindrical portion 9 may be an oval circular cross section or a flat shaped cross section instead of the long circular cross section. These configurations can be applied to the embodiments in FIGS. 1 to 6.

Figure 2:
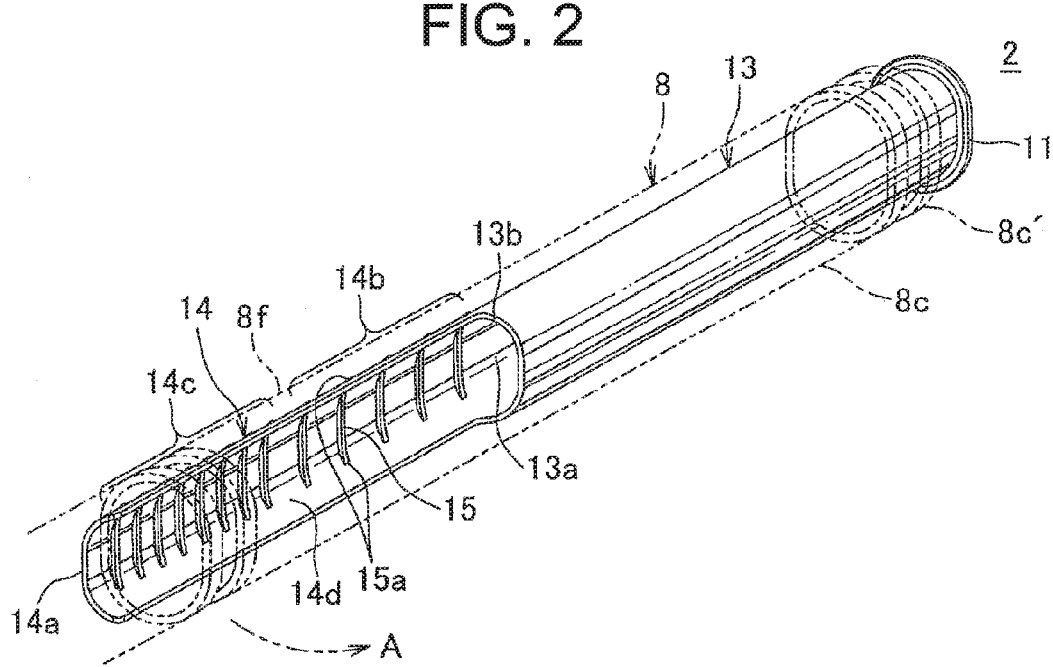
FIG. 2 is a perspective view of a second embodiment of the harness bending regulation member.

The harness bending regulation member 2 illustrated in FIG. 2 includes a cylindrical portion (unbendable portion or high rigid portion) 13 having a long circular cross section, and a spatulate portion (bendable portion or low rigid portion) 14 which integrally extends from a tip end 13b of the cylindrical portion 13 in one side 13a on the short-diameter side of the cylindrical portion 13. The spatulate portion 14 extends with a uniform width in the axial direction.

The spatulate portion 14 is provided with a plurality of slits 15 arranged in parallel from its base end to its tip end 14a such that the number of the slits 15 is gradually increased. Alternatively, a smaller number of slits 15 are placed on abase end side half portion 14b of the spatulate portion 14, and a larger number of slits 15 are placed on an end side half portion 14c of the spatulate portion 14. The slits 15 are formed in a curved shape along a width direction of the spatulate portion 14 such that the slits 15 penetrate the spatulate portion 14 in its thickness direction. Both ends 15a of the slits 15 in the longitudinal direction terminate before both ends of the spatulate portion 14 in its width direction, and both the ends 15a of the slits 15 are continuous with curved both ends 14d of the spatulate portion 14 in the width direction. Since the spatulate portion 14 is a cantilever beam, its tip end 14a bends (with small radius) larger in a quadratic curve manner than the base end, and the bending tendency thereof is promoted by the larger number of slits 15 placed on the tip end portion of the spatulate portion 14.

The spatulate portion 14 can be provided with projections (not shown) instead of the slits 15. The number of projections is gradually reduced toward the tip end of the spatulate portion 14. According to this, it is possible to exert the same effect as that when the number of slits 15 is gradually increased toward the tip end 14a of the spatulate portion 14 (effect that spatulate portion 14 is prone to bend toward tip end 14a). A base end of the cylindrical portion 13 is provided with the flange 11 facing outward.

In a state where the bending regulation member 2 is inserted inside of the corrugated tube 8 having the long circular cross section shown by the chain lines, when a bending force in a short-diameter direction is applied to the corrugated tube 8 as shown by the arrow A, an inner surface on the short-diameter side of the corrugated tube 8 pushes and comes into contact with an outer surface of the spatulate portion 14 of the bending regulation member 2, and the spatulate portion 14 bends in a quadratic curve manner together with the intermediate portion 8f of the corrugated tube 8 in the longitudinal direction. An end 8c of the corrugated tube 8 is prevented from bending by the cylindrical portion 13 of the bending regulation member 2.

Figure 3:
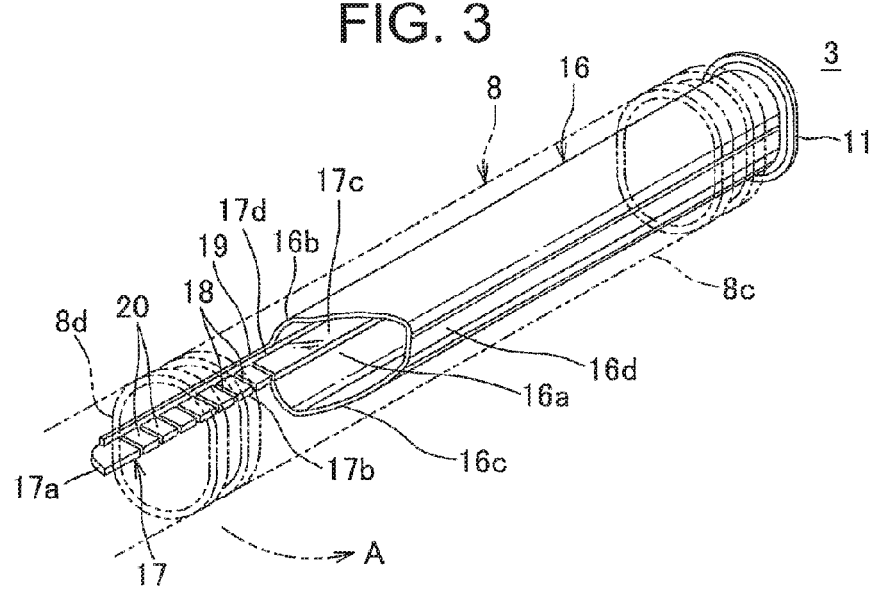
FIG. 3 is a perspective view illustrating a third embodiment of the harness bending regulation member.

The harness bending regulation member 3 illustrated in FIG. 3 includes a cylindrical portion having a long circular cross section (unbendable portion or high rigid portion) 16, a band plate-shaped rib (bendable portion or low rigid portion) 17 straightly and integrally projecting (extending) in the axial direction from the tip end side 16b of the cylindrical portion 16 in one side 16a on the short-diameter side of the cylindrical portion 16, and a plurality of parallel slits 18 notched outward from an inner end surface 17b of the rib 17.

The rib 17 extends also from an inner surface of the cylindrical portion 16 (extended portion is shown by reference sign 17c) and the rib 17 is widely formed on the short-diameter side of the cylindrical portion 16, and a width of the rib 17 is narrow on a long-diameter side. Each of the slits 18 is formed in the rib 17 projecting outward from the cylindrical portion 16, and the slit 18 is notched from an inner surface 16a of the rib 17 to a portion in the vicinity of an outer surface. Upper and lower portions of an outer surface of the rib 17 are integrally provided with low flange walls (protective tube support portions or connection walls)

19, the slits 18 are notched to portions in front of the flange walls 19, the narrow rib 17 is reinforced by the flange walls 19, and a contact area (push and contact) with respect to the inner surface of the corrugated tube 8 is increased. Portions including the flange walls 19 can also be called the rib 17.

A pitch between the slits 18 in this example is uniform. The pitch between the slits 18 can gradually be reduced toward the projecting tip end 17a of the rib 17 so that the tip end 17a of the rib can easily be bent. The base end of the cylindrical portion 16 is provided with the flange 11 facing outward. The rib 17 of this example is formed shorter than the spatulate portion 14 in FIG. 2, and the rib 17 can correspond to a bent portion of the corrugated tube 8 having a small diameter for example.

The rib 17 is divided into a plurality of pieces (divided rib or divided wall) 20 by each of the slits 18 (pieces 20 are connected to each other through outside flange wall 19), and when the rib 17 bends inward as shown by the arrow A, adjacent and opposed end surfaces of the pieces 20, i.e., adjacent and opposed end surfaces of the slits 18 abut against each other, and the rib 17 is prevented from further bending (bending is regulated). While the adjacent and opposed end surfaces of the slits 18 abut against each other, the rib 17 can easily be bent by a small force.

If a bending force in a short-diameter diameter is applied to the corrugated tube 8 as shown by the arrow A in a state where the bending regulation member 3 is inserted into and placed in the corrugated tube 8 shown by chain lines, the one side 8d of the short-diameter side of the corrugated tube 8 pushes and comes into contact with an outer surface including the flange walls 19 of the rib 17 of the bending regulation member 3, and the rib 17 together with the corrugated tube 8 bend inward in the direction of the arrow A around the tip end side 16b (base end 17d of rib 17) of the cylindrical portion 16 as a fulcrum. When the rib 17 bends to some extent, opposed inner surfaces of the slits 18 (opposed outer surfaces of pieces 20) of the rib 17 abut against each other, and the rib 17 is restrained from further bending. The end 8c of the corrugated tube 8 is prevented from bending by the cylindrical portion 16 of the bending regulation member 3 (bending is straightly regulated). The base end 17d of the rib 17 is continuous with the tip end 16b of the one side 16a of the cylindrical portion 16, and the tip end 16b is continuous with the other end portion 16d through an inclined portion 16c.

The rib 17 in FIG. 3 can bend also outward, i.e., in a direction opposite from the arrow A unlike the spatulate portions 10 and 14 in FIGS. 1 and 2. In this case, the pieces 20 of the rib 17 do not abut against each other and the bending radius (angle) of the rib 17 is not regulated, and the rib 17 can bend with a small radius. In this case, the rib 17 is not pushed by the inner surface of the corrugated tube 8 but is pushed and bent by the plurality of electric wires (not shown) inserted into the corrugated tube 8 in a direction opposite from the arrow A.

Figure 4A:
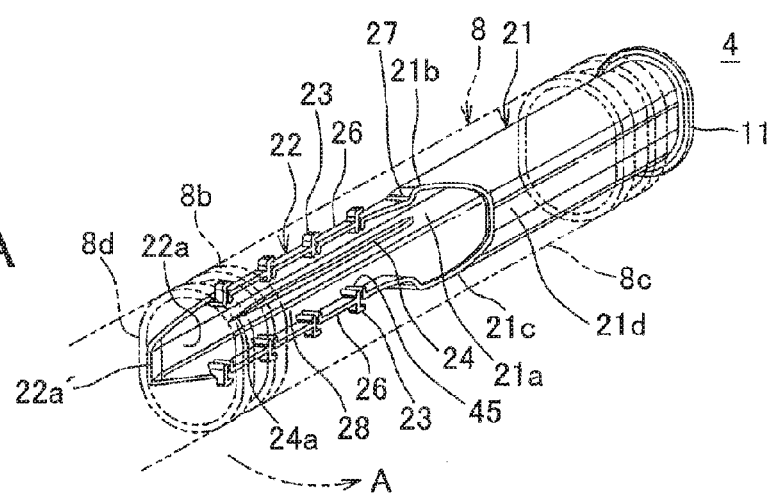
Figure 4B:
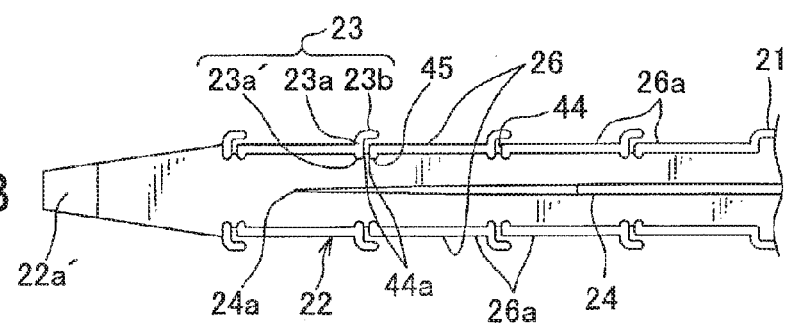

The harness bending regulation member 4 illustrated in FIGS. 4A and 4B includes a cylindrical portion (unbendable portion or high rigid portion) 21 having a long circular cross section, a spatulate portion (bendable portion or low rigid portion) 22 which integrally extends in the axial direction from the tip end side 21b of the cylindrical portion 21 in one side 21a of a short-diameter side of the cylindrical portion 21, horizontal end walls 26 formed on an end in a width direction (vertical direction) of the spatulate portion 22, a plurality of slits 44 provided parallel to both the end walls 26 and vertically symmetrically, long projections 23 provided on front ends of the slits 44, and short projections 45 provided on rear ends of the slits 44.

A width of the spatulate portion 22 is formed uniform from the base end of the spatulate portion 22 to a portion in the vicinity of the tip end portion 22a, the tip end portion 22a is tapered toward its tip end, a tip end of the tip end portion 22a inclines inward, and an insertion guide 22a' is formed with respect to the corrugated tube 8. A straight groove 24 is provided in a central portion of an inner surface of the spatulate portion 22 in the width direction, and inward (direction of arrow A) bending rigidity of the spatulate portion 22 is enhanced for example. A width of the groove 24 is gradually reduced toward a tip end 24a (see FIG. 4B), and the spatulate portion 22 is prone to bend toward the tip end portion 22a.

The upper and lower end walls 26 which are both ends of the base end of the spatulate portion 22 in the width direction are continuous with upper and lower tip ends 21b of the cylindrical portion 21 through a difference 27 in level, and the tip ends 21b are continuous with the other end portion 21d through an inclined portion 21c. A base end of the cylindrical portion 21 is provided with the flange 11 facing outward. The spatulate portion 22 is composed of a main body 28 forming a portion of a long circular cross section and having a curved cross section, and the end walls 26 which are substantially horizontal both ends projecting in a form of a flange inward in both sides of the main body 28 in the width direction. The both end walls 26 are provided with the plurality of slits 44 and the projections 23 and 45 on front and rear ends of the slits 44 in parallel and vertically symmetrically.

As illustrated in FIG. 4B, each of the projections 23 is composed of a vertical piece portion 23a intersecting with the end wall 26 at right angles, an inward extending piece portion 23a' crossing the end wall 26 as a portion of the vertical piece portion 23a and extending inward, and a horizontal piece portion 23b projecting in a flange form from the outer end of the vertical piece portion 23a toward the base end (rear side). The other projection (projection) 45 is provided in an inward facing flange opposed to the inward extending piece portion 23a' of one of the projections 23. The end walls 26 are composed of a plurality of divided end walls (divided walls) 26a which are divided by the plurality of slits 44.

The vertical piece portion 23a including an extension piece portion 23a' of one of the projections 23 and the other projection 45 increase areas of the opposed inner surfaces 44a of the slits 44 of the end walls 26, i.e., areas of the opposed front and rear end surfaces of the two adjacent divided end walls 26a. When the spatulate portion 22 bends in the direction of the arrow A (inward), the inner surfaces abut against each other with large areas, and the spatulate portion 22 is reliably restrained from further bending. When both the projections 23 and 45 do not exist, the front and rear end surfaces of the slits 44 of the end walls 26, i.e., opposed front and rear end surfaces of the divided end walls 26a abut against each other with small areas. Hence, there is concern that deviation in the vertical direction is generated, and abutment is unintentionally released, but deviation is not generated or the deviation is absorbed by both the projections 23 and 45 and the end surfaces 44a of the divided end walls 26a are reliably abutted against each other. The horizontal piece portion 23b of the projection 23 functions as a stopper with respect to the outer surfaces of the adjacent divided end walls 26a, and prevents outward large deviation of the adjacent divided end walls 26b. Even when the other projection 45 is eliminated, the vertical piece portion 23a including the extension piece portion 23a' of the projection 23 absorbs vertical deviation of the end surfaces of the divided end walls 26a, and the end surfaces 44a reliably abut against each other. Directions such as the vertical direction and the longitudinal direction used in the description (specification) are described for the sake of convenience of explanation.

The outer surface of each of the horizontal piece portions 23b (surface shown by reference sign 23b) is located at the same height as the outer surface of the cylindrical portion 21, and it is possible to stably support the inner surface of the corrugated tube 8 (FIG. 4A) together with the cylindrical portion 21. Since the horizontal piece portion 23b projects rearward and when the bending regulation member 4 is forwardly inserted into the corrugated tube 8 from the tip end 22a', the inner surface of the corrugated tube 8 is prevented from being caught in concavo-convex portion. The same or similar projections as or to the projections 23 and 45 in FIG. 4 can be provided on end edges of the slits 18 of the rib 17 in FIG. 3 or an end edge of groove 32 of a later-described projection plate 30 in FIG. 5.

When a bending force in the direction of the arrow A is applied to the corrugated tube 8 in a state where the bending regulation member 4 is inserted into and placed in the corrugated tube 8, the outer surface of the spatulate portion 22 is pushed by an inner surface of the one side 8d of the corrugated tube 8, and the spatulate portion 22 is bent in the direction of the arrow A (inward) together with the corrugated tube 8. When the spatulate portion 22 is bent, the end walls 26 are bent in the slits 44, opposed inner surfaces 44a of the slits 44 including the opposed inner surfaces of the projections 23 and 45 abut against each other with large areas, and the inner surfaces are reliably prevented from further bending. The end 8c of the corrugated tube 8 is prevented from bending by the cylindrical portion 21 of the bending regulation member 4.

The harness bending regulation member 5 illustrated in FIGS. 5A and 5B includes a cylindrical portion (unbendable portion or high rigid portion) 29 having a long circular cross section, a projection plate (bendable portion or low rigid portion) 30 which straightly and integrally projects (extends) in the axial direction from the tip end of the cylindrical portion 29 in one side 29a on the short-diameter side of the cylindrical portion 29, and a plurality of pairs of curved projection pieces 31 formed on an end (end surface) in the width direction (vertical direction) of the projection plate 30.

The projection plate 30 is formed wider than the rib 17 in FIG. 3 in the vertical direction and formed into a flat plate shape. The projection plate 30 is formed thicker than the cylindrical portion 29. An outer surface of the projection plate 30 is located on substantially the same plane as the outer surface of the cylindrical portion 29, the inner surface 30b of the projection plate 30 more projects inward than the inner surface of the cylindrical portion 29, and the base end of the projection plate 30 is continuous with the inner surface of the one side 29a of the cylindrical portion 29 at the inclined surface 30c. A tip end of the one side 29a of the cylindrical portion 29 is continuous with the other end portion 29b through the inclined portion 29c. Since the cylindrical portion 29 has the long circular cross section, central portions of both sides (side walls) 29a and 29b are flat wall portions (this configuration is in common in other embodiments), and an outer surface of the projection plate 30 is located on an extension of an outer surface of a flat wall portion of the one side 29a of the cylindrical portion 29.

The plurality of narrow slit-shaped grooves 32 are formed along the width direction of the projection plate 30 on the side of the outer surface of the projection plate 30, and the grooves 32 are placed in parallel in the longitudinal direction of the projection plate 30. A pair of the grooves 32 are placed in front and rear of each of the curved projection pieces 31. By the outer surface side grooves 32, the projection plate 30 can easily bend inward (direction of arrow A, i.e., opening direction of groove 32) in the thickness direction. When the projection plate 30 bends outward (direction of arrow B, i.e., closing direction of groove 32), opposed inner surfaces of the grooves 32 abut against each other, and the projection plate 30 is prevented from further bending. Like the placement of the slits 15 in FIG. 2, it is possible to employ such a configuration that a larger number of grooves 32 are placed on the side of the tip end, and a smaller number of grooves 32 are placed on the side of the base end.

The plurality of electric wires (not shown) inserted into the cylindrical portion 29 are routed along the inner surface 30b of the projection plate 30 (this configuration is in common in spatulate portion 10 of embodiments). The pair of upper and lower curved projection pieces 31 are for preventing the plurality of electric wires (not shown) of the wire harness from projecting from the harness bending regulation member 5. The electric wires are stably supported along the inner surface 30b of the projection plate 30 and the inner surfaces 31b of the upper and lower projection pieces 31. The outer surface of each of the projection pieces 31 is continuous with the outer surface of the projection plate 30 on the same plane (see FIG. 5B), and the outer surface of each of the projection pieces 31 can stably support the inner surface of the corrugated tube 8 together with the outer surface of the projection plate 30. The upper and lower projection pieces 31 can also be applied to the narrow rib 17 in FIG. 3. The base end of the cylindrical portion 29 is provided with the flange 11 facing outward.

In a state where the bending regulation member 5 is inserted into the corrugated tube 8, the corrugated tube 8 is stably supported by the projection plate 30 and the pair of projection pieces 31. When a bending force in the direction of the arrow A is applied to the corrugated tube 8, the outer surface of the projection plate 30 and the outer surfaces of the projection pieces 31 are pushed by the inner surface of the corrugated tube 8, and the projection plate 30 bends inward (direction to open grooves 32) together with the corrugated tube 8.

When a bending force in the opposite direction of the arrow B is applied to the corrugated tube 8, the projection plate 30 easily bends in a direction to close the grooves 32, the opposed inner surfaces of the grooves 32 abut against each other (grooves 32 are closed), and the inner surfaces are prevented from further bending. The projection plate 30 is bent outward (direction of arrow B) if the plurality of electric wires (not shown) of the wire harness push and come into contact with the inner surface 30b of the projection plate 30. The end 8c of the corrugated tube 8 is prevented from bending by the cylindrical portion 29 of the bending regulation member 5.

The harness bending regulation member 6 illustrated in FIG. 6 includes a cylindrical portion (unbendable portion or high rigid portion) 33 having a long circular cross section, a spatulate portion (bendable portion or low rigid portion) 34 which integrally extends in the axial direction from a tip end of the cylindrical portion 33 in one side 33a on the short-diameter side of the cylindrical portion 33, and a plurality of slits 35 penetrating an end of the spatulate portion 34 in the width direction (vertical direction).

A width of the spatulate portion 34 is uniform from its base end toward a tip end 34a of the spatulate portion 34.

The spatulate portion 34 is composed of a flat band-shaped plate portion 36 at a central portion thereof in the width direction, and plate portions 37 provided on both sides in the width direction (vertical direction). Each of the plate portions 37 has an arc cross section. The plurality of slits 35 are formed in the plate portions 37 in parallel in the longitudinal direction of the plate portion vertically symmetrically along the width direction of the plate portion. A plurality of divided plates (divided walls shown by reference signs 37) are placed between the slits in parallel. A base end of the spatulate shape 34 is continuous with a tip end 33b of one side 33a of the cylindrical portion 33, and the tip end 33b is continuous with the other side 33d of the cylindrical portion 33 through an inclined portion 33c. A base end of the cylindrical portion 33 is provided with a flange 11 facing outward.

When the bending force in the direction of the arrow A is applied to the corrugated tube 8 in a state where the bending regulation member 6 is inserted into and placed in the corrugated tube 8, the spatulate portion 34 bends inward together with the corrugated tube 8, the opposed inner surfaces of the upper and lower slits 35 of the spatulate portion 34 abut against each other, and the spatulate portion 34 is prevented from further bending. When a bending force in a direction opposite from the arrow A is applied to the corrugated tube 8, the spatulate portion 34 is pressed by the plurality of electric wires (not shown) inserted into the cylindrical portion 33 and is bent outward, the opposed inner surfaces of the slits 35 do not abut against each other, and a direction is changed into the opening direction. Therefore, the spatulate portion 34 can bend outward with a smaller bending radius than inward. The end 8c of the corrugated tube 8 is prevented from bending at the cylindrical portion 33 of the bending regulation member 6.

Figure 7A:
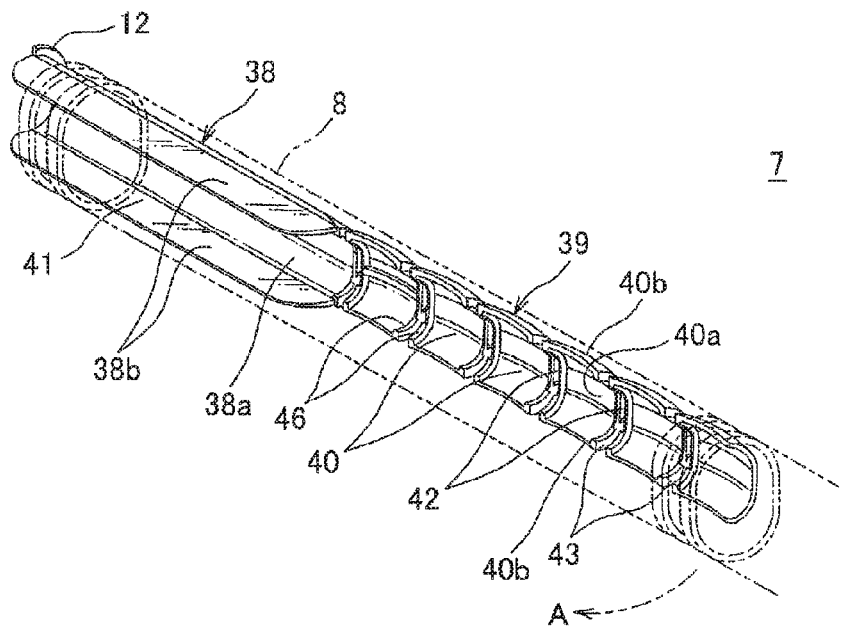
Figure 7B:
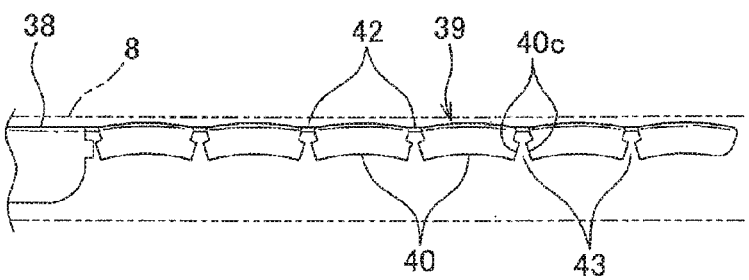
Figure 7C:
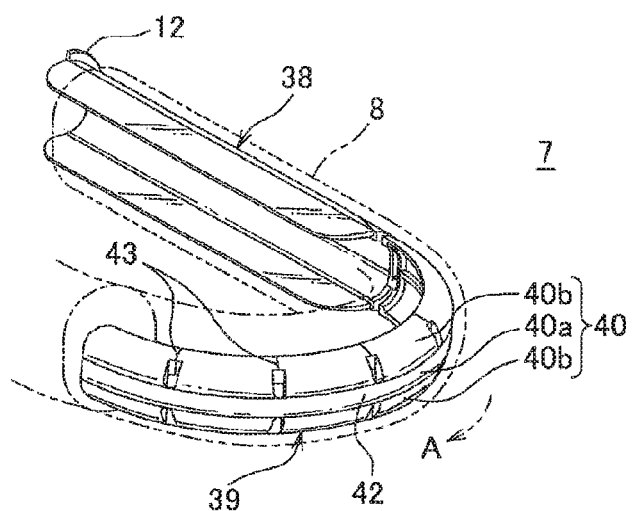

The harness bending regulation member 7 illustrated in FIGS. 7A to 7C includes a guttering portion (unbendable portion or high rigid portion) 38 having a semi-annular cross section forming a portion of a long circular cross section, and a connection wall (bendable portion or low rigid portion) 39 which integrally extends from a tip end of the guttering portion 38 in a side 38a on a short-diameter side of the guttering portion 38. The connection wall 39 is formed by connecting a plurality of divided walls 40 to each other.

A base end of the guttering portion (guttering wall) 38 is provided with a semi-annular flange 12 facing outward. The guttering portion 38 has a shape extending along an inner peripheral surface of the corrugated tube 8 having the long circular cross section. The guttering portion 38 includes a substantially flat wall portion (38a) at a central portion in the width direction, and a curved wall portion 38b which is continuous with both sides (upper and lower) in the width direction of the flat wall portion 38a. The guttering portion 38 includes an opening 41 for inserting the electric wires in between projecting tip ends of the curved wall portion 38b on both sides.

The connection wall 39 is composed of a plurality of divided walls 40 which are curved along the width direction, and along a longitudinal direction (axial direction), and a narrow and flexible hinge portion 42 which connects, to each other, central portions of the divided walls 40 in the width direction. The divided wall 40 is formed slightly narrower than the guttering portion 38. The divided wall 40 is composed of a central portion 40a (FIG. 7C) which is flat along the width direction. The central portion 40a extends along the inner peripheral surface of the corrugated tube 8 having a long circular cross section. The divided wall 40 is also composed of curved portions 40b on both sides (vertical direction) in the width direction. The divided walls 40 are located through slits (gaps) 43 in the width direction (vertical direction) and the central hinge portion 42 in the width direction is located in the slits (gaps) 43, and the hinge portion 42 forms a portion of the band-shaped central portion 40a.

As illustrated in FIG. 7B, each of the divided walls 40 of the connection wall 39 has a curved cross section also in the longitudinal direction. Front and rear end surfaces of each of the divided walls 40, i.e., opposed inner surfaces 40c of the slits 43 between the divided walls 40 open in a tapered manner, and the inner surface 40c substantially intersects with the outer surface of the divided wall 40 at right angles. Projections 46 which project in a form of a flange are formed on front and rear ends of the divided walls 40. The projections 46 are formed into curved shape along a curved shape in the width direction (vertical direction) of the divided walls 40. A thickness of the end of the divided wall 40 is increased by the projection 46, and an area of the inner surface 40c of the slit 43 is increased (inner surface 40c of slit 43 is formed of end surface of divided wall 40 and end surface of projection 46 which is flush with end surface of divided walls 40). According to this, like the projections 23 and 45 of the embodiment in FIG. 4, the front and rear end surfaces 40c of the divided walls 40 reliably abut against each other without deviating in the vertical direction and the lateral direction (bending direction), or deviation in the vertical direction and the lateral direction (bending direction) is absorbed when the connection wall 39 is bent, and it is possible to reliably regulate the bending of the connection wall 39 (excessive bending is prevented).

The hinge portion 42 is placed on the side of outer surfaces of the divided walls 40 (flush with outer surface). Therefore, the connection wall 39 can bend outward, and a bending radius is regulated when the connection wall 39 bends inward. When the bending force in the direction of the arrow A is applied to the corrugated tube 8 in a state where the bending regulation member 7 is inserted into the corrugated tube 8, the outer surface of the connection wall 39 is pushed by the inner surface of the corrugated tube 8 in the direction of the arrow A and the connection wall 39 bends with a relatively small bending radius so that the connection wall 39 is folded back inward together with the corrugated tube 8 as illustrated in FIG. 7C, and adjacent opposed end surfaces of the divided walls 40, i.e., inner surfaces 40c of the slits 43 abut against each other, and further bending is prevented. Like the cylindrical portion 9 in other example, the guttering portion 38 substantially completely prevents the corrugated tube 8 from bending.

The bending radius of the connection wall 39 can be changed into a desired value by narrowing the slit (gap) 43 between the divided walls 40 of the connection wall 39 or by increasing or reducing an inclination (opening) angle of the front and rear end surfaces of the divided walls 40, i.e., of the inner surface 40c of the slit 43. It is also possible to form a projection similar to the projection 46 in FIGS. 7A to 7C on an end edge of the slit 35 of the spatulate portion 34 in FIG. 6. It is also possible to form a straight projection (not shown) similar to the projection 46 in FIGS. 7A to 7C on the end edge of the slit 32 of the projection plate 30 in FIG. 5.

In the embodiment in FIG. 7A, it is possible to employ such a configuration that the guttering portion 38 is formed into a cylindrical portion (9) as in the embodiment illustrated in FIG. 1, the cylindrical portion (9) is divided such that it can open and close in the lateral direction (radial direction) through a hinge on the lower end to enhance the inserting operability of the electric wires into the cylindrical portion (9), divided surfaces of upper ends of the pair of right and left divided cylindrical portions are alternately provided with straight projections having abutting surfaces which function as the projections 46 illustrated in FIG. 7A for example, and positional deviation in the radial direction and the axial direction of the divided surfaces of the upper ends is absorbed (prevented).

FIG. 8 shows one embodiment of the harness routing structure using the harness bending regulation member of the present invention. For the sake of convenience, the bending regulation member 1 illustrated in FIG. 1 is used as the harness bending regulation member.

In this harness routing structure, a wire harness 55 is routed from an electricity-supply device 52 on the side of a vehicle body (fixing structure) 51 of a car to an electricity-supply device 54 on the side of the slide door (slide structure) 53. In FIG. 8, a fully closed state of the slide door 53 is shown by solid lines in a right drawing, a halfway opened state of the slide door 53 is shown by solid lines in a middle drawing, and a fully opened state of the slide door 53 is shown by solid lines in a left drawing for the sake of convenience.

At an initial opening stage of the slide door 53, it separates outward of the vehicle from a platform of the vehicle body 51. The electricity-supply devices 52 and 54 are composed of oscillating members (not shown) which can oscillate in the horizontal direction and support members 56 and 57 which support the oscillating members. Ends 8c and 8g of the corrugated tube (harness protective tube) 8 on the side of an outer periphery of the wire harness 55 are held by the oscillating members of the electricity-supply devices 52 and 54. The wire harness 55 is composed of the corrugated tube 8 and a plurality of electric wires 58 inserted into the corrugated tube 8. In FIG. 8, a reference sign 51 represents a lower rear portion of a step portion of the platform of the vehicle body, and a reference sign 53 represents a door inner panel of the slide door.

The harness bending regulation member 1 is inserted into the corrugated tube 8 on the side of the electricity-supply device 52 on the side of the vehicle body, the cylindrical portion (unbendable portion) 9 of the bending regulation member 1 is placed in the one end portion 8c of the corrugated tube 8, and the spatulate portion (bendable portion) 10 is placed in the vehicle (when door is fully closed) or on the front side of the vehicle (when door is halfway opened and fully opened) in the intermediate portion 8f in the longitudinal direction which is continuous with the one end portion 8c of the corrugated tube 8.

As shown in the right drawing in FIG. 8, when the slide door 53 is fully closed, the corrugated tube 8 of the wire harness 55 is routed in a state where the corrugated tube 8 is substantially straightly extended from the electricity-supply device 52 on the side of the vehicle body to the electricity-supply device 54 on the side of the slide door. The spatulate portion 10 of the bending regulation member 1 is located substantially straightly along the corrugated tube 8.

As shown in the middle drawing in FIG. 8, when the slide door 53 is halfway opened, the cylindrical portion 9 of the bending regulation member 1 prevents the corrugated tube 8 from bending, an outer surface 10d of the spatulate portion 10 is pushed by an inner surface 8f on the front side of the vehicle of the corrugated tube portion 8f close to the electricity-supply device 52 on the side of the vehicle body, the spatulate portion 10 bends in a curved form outward of the vehicle, and the corrugated tube portion 8f close to the electricity-supply device 52 on the side of the vehicle body bends forward in a substantially U-shape together with the spatulate portion 10 (bent portion is shown by reference sign 8h). That is, the spatulate portion 10 restrains the corrugated tube portion 8f from bending in a curved form (prevents corrugated tube portion 8f from further bending). According to this, the corrugated tube portion close to the electricity-supply device 54 on the side of the slide door bends rearward in a substantially U-shape (bent portion is shown by reference sign 8j), and the corrugated tube 8 smoothly bends in a substantially S-shape as a whole.

When the slide door 53 opens from the fully closed state, the corrugated tube portion close to the electricity-supply device 52 on the side of the vehicle body is restrained from bending (8h) by the cylindrical portion 9 of the bending regulation member 1, and is maintained in a substantially straightly extended state (bending is regulated).

A rearward substantially U-shaped bent portion 8j of the corrugated tube portion 8m close to the electricity-supply device 54 on the side of the slide door is formed, a forward substantially U-shaped bent portion 8h of the corrugated tube portion 8f close to the electricity-supply device 52 on the side of the vehicle body is restrained from bending in a curved shape by the spatulate portion 10 of the bending regulation member 1, a minimum bending radius of the corrugated tube 8 is secured between both the electricity-supply devices 52 and 54, and the corrugated tube 8 is smoothly bent into a substantially S-shaped without being buckled. According to this, bending endurance (of wire harness 55) between the corrugated tube 8 and the plurality of electric wires 58 inserted into the corrugated tube 8 is enhanced. When the slide door 53 is fully closed and halfway opened, turning motion of the oscillating members (not shown) of both the electricity-supply devices 52 and 54 is slight.

As shown in the left drawing in FIG. 8, when the slide door 53 fully opens, the electricity-supply device 54 on the side of the slide door is located rearward of the electricity-supply device 52 on the side of the vehicle body, the oscillating member of the electricity-supply device 52 on the side of the vehicle body turns rearward from front in the counterclockwise direction and stops, the oscillating member of the electricity-supply device 54 on the side of slide door turns forward from rear in the counterclockwise direction, and the corrugated tube 8 is pulled rearward between both the electricity-supply devices 52 and 54. The wire harness 55 oscillates rearward of the vehicle from a front side of the vehicle around the electricity-supply device 52 on the side of the vehicle body 51 as a fulcrum between the wire harness 55 and the slide door 53.

When the slide door 53 fully opens, the intermediate portion 8k in the longitudinal direction of the corrugated tube 8 is prone to interfere with a lower rear end 51a of the platform of the vehicle body 51 (electricity-supply device 52 on the side of the vehicle body is placed at lower side of step portion of platform or in the vicinity of step portion), but the outer surface of the cylindrical portion 9 of the bending regulation member 1 abuts against the inner surface of the one end portion 8c of the corrugated tube 8 close to the electricity-supply device 52 on the side of the vehicle body, and the one end portion 8c of the corrugated tube 8 projects in the thickness direction of the slide door toward the outside of the vehicle from the electricity-supply device 52 on the side of the vehicle body.

According to this, the corrugated tube portion 8f which is continuous with the one end portion 8c separates outward from the vehicle body 51, and interference between the intermediate portion 8k in the longitudinal direction of the corrugated tube 8 and the lower rear end 51a of the platform of the vehicle body 51 is prevented. According to this, the wear and damage of the corrugated tube 8 are prevented, and the plurality of electric wires 58 routed inside the corrugated tube 8 are safely protected. The spatulate portion 10 of the bending regulation member 1 does not bend up to the bending regulation radius, and the spatulate portion 10 bends with a large radius together with the corrugated tube portion 8*f* (bent portion of corrugated tube is shown by reference sign 8*n*).

When the slide door 53 halfway opens or fully opens, since the bending regulation member 1 includes the high rigid cylindrical portion (unbendable portion) 9 and the flexible spatulate portion (bendable portion) 10. Hence, as compared with a case where a bending regulation member (not shown) having only the cylindrical portion 9 is used, the corrugated tube 8 can bend in the quadratic curve manner by the spatulate portion 10, and it is possible to prevent the corrugated tube 8 from being folded and bent.

Although the bending regulation member 1 illustrated in FIG. 1 is used in FIG. 8, the spatulate portion 14 exerts the same effect even when the bending regulation member 2 illustrated in FIG. 2 is used. When the bending regulation member 3 illustrated in FIG. 3 is used also, the rib 17 is placed at the same position as the spatulate portion 10, the opposed inner surfaces of the slits 18 abut against each other, and the bending is regulated in the same manner. Even when the bending regulation member 4 illustrated in FIG. 4 is used, the spatulate portion 22 exerts the same effect.

When the bending regulation member 5 illustrated in FIG. 5 is used, the projection plate 30 is placed at a position 180° opposite from the spatulate portion 10 in FIG. 8 (outside vehicle when slide door 53 fully closes and rear side of the vehicle when slide door 53 fully opens). According to this, a bending force at an initial bending state of the projection plate 30 in the direction of the arrow B can be made small by the effect of the grooves 32 of the projection plate 30 and a bending force (force required for bending) in mid-course of the bending can be made greater, and the same effect as that described above can be exerted. Even when the bending regulation member 6 illustrated in FIG. 6 is used, the spatulate member 34 exerts the same effect.

When the bending regulation member 7 illustrated in FIG. 7 is used, placement of the connection wall 39 is the same as that of the spatulate portion 10 shown in FIG. 8, the opposed inner surfaces 40*c* of the slits 43 of the connection wall 39 abut against each other and the bending of the corrugated tube 8 is regulated in the same manner.

Figure 9:
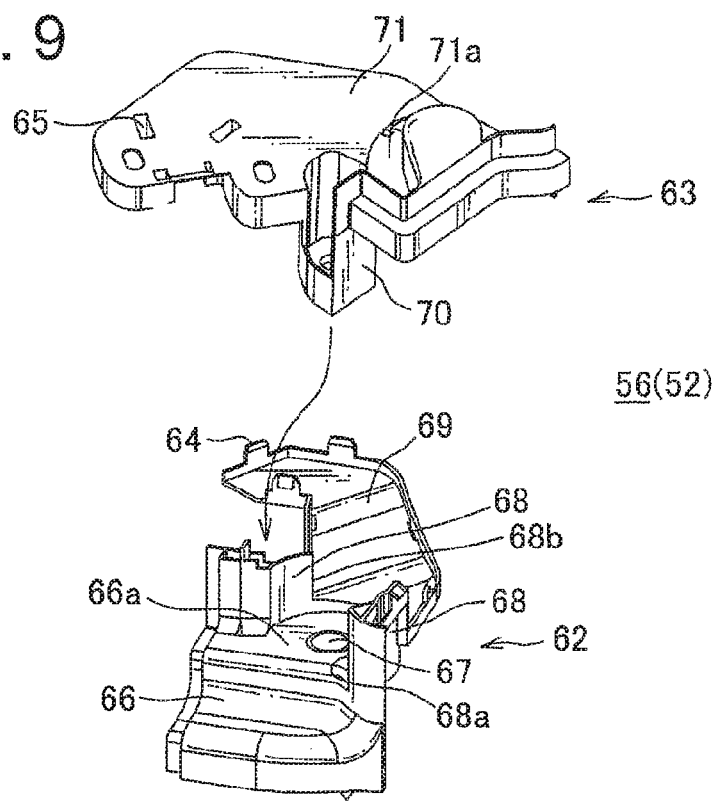
FIG. 9 is an exploded perspective view illustrating one embodiment of an outer member of an electricity-supply device on the side of a vehicle body in the harness routing structure.
Figure 10:
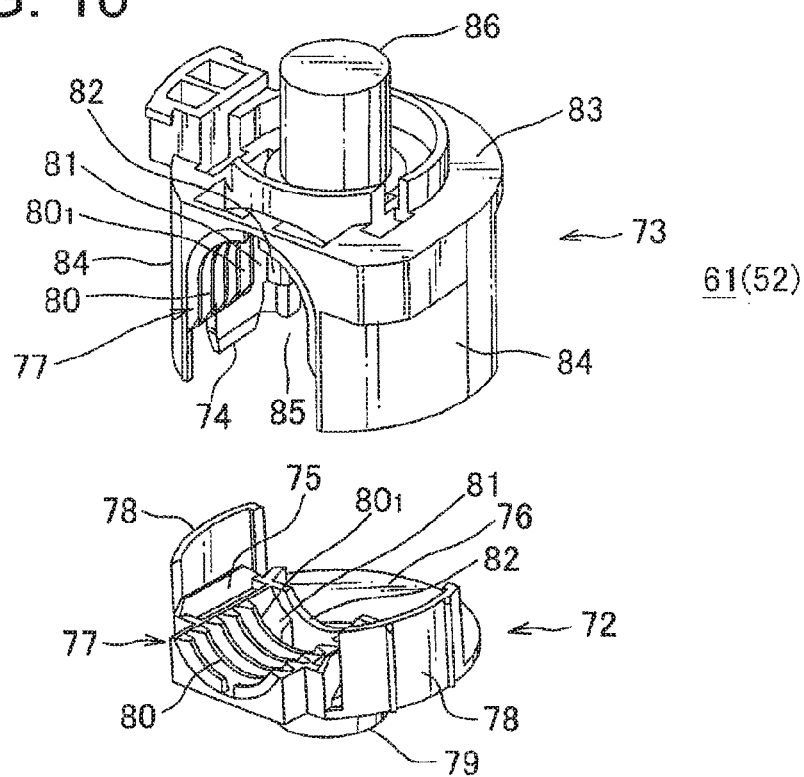
FIG. 10 is an exploded perspective view illustrating one embodiment of an inner member of the electricity-supply device on the side of the vehicle body.

FIGS. 9 to 10 illustrate one embodiment of the electricity-supply device 52 on the side of the vehicle body illustrated in FIG. 8. FIG. 9 illustrates a support member 56 of the electricity-supply device 52, and FIG. 10 shows an oscillating member 61 of the electricity-supply device 52. The support member 56 is also called outer member, and the oscillating member 61 is also called inner member and turning member and rotation body.

The support member 56 illustrated in FIG. 9 is composed of a lower side base member 62 made of synthetic resin and an upper side cover member 63. The oscillating member 61 illustrated in FIG. 10 is supported between the base member 62 and the cover member 63 such that the oscillating member 61 can horizontally turn (oscillate). The base member 62 and the cover member 63 are welded and fixed to each other through lock means (lock pawl 64 and lock recess 65).

The base member 62 includes a horizontal base plate 66, a circular bearing hole 67 provided in a central portion of a disk portion 66*a* of the base plate 66, side walls 68 standing from both right and left sides of the base plate 66, front and rear openings 68*a* and 68*b* formed between both the side walls 68, and a horizontal harness lead-out wall 69 which is continuous with the rear opening 68*b*. In FIG. 9, the front opening 68*a* is placed facing the slide door 53 illustrated in FIG. 8.

The cover member 63 includes right and left side walls 70 which are superposed on both the side walls 68 of the base member 62, a horizontal ceiling wall 71 opposed to the base plate 66 and the harness lead-out wall 69, and a circular bearing hole (not shown) provided in a disk portion 71*a* of the ceiling wall 71 opposed to a shaft support hole 67. FIG. 8 is a plan view of a portion of the base plate 66 of the base member 62 and the cover member 63.

The oscillating member 61 illustrated in FIG. 10 is composed of a lower side small base portion 72 and an upper side large cover portion 73. The base portion 72 and the cover portion 73 are assembled to and fixed to each other through lock means (lock pawl 74 and lock recess 75). The base portion 72 includes a substantially circular base plate 76, a corrugated tube holder 77 provided on a front half side of the base plate 76, arc side walls 78 standing on right and left sides of the corrugated tube holder 77, and a vertical circular shaft 79 provided on a central portion of a lower surface of the base plate 76.

The corrugated tube holder 77 includes a plurality of arc ribs 80 arranged in the longitudinal direction with an equal pitch, an arc groove 81 formed in adjacent behind a rear end rib $80_1$, and an arc stopper wall 82 provided in adjacent behind the groove 81 (groove 81 is formed between rear end rib $80_1$ and stopper wall 82). The concave grooves 8*a* on an outer periphery of one end of the corrugated tube 8 are engaged with the ribs 80. The shaft 79 is turnably engaged with the bearing hole 67 of the base member 62. The base end flanges 11 and 12 of the bending regulation members 1 to 7 of the embodiments illustrated in FIGS. 1 to 7 are engaged with the grooves 81 (this configuration will be described later with reference to FIGS. 11 and 12).

The cover portion 73 includes a substantially circular ceiling wall 83, arc side walls 84 hanging from right and left sides of the ceiling wall 83, a reversed U-shaped side wall 85 formed between both the side walls 84, a corrugated tube holder 77 provided on a front half side of the harness insertion groove 85, and a circular shaft 86 standing on a central portion of an upper surface of the ceiling wall 83.

The corrugated tube holder 77 includes a plurality of substantially U-shaped ribs 80 arranged in parallel in the longitudinal direction, the substantially U-shaped groove 81 formed in adjacent behind the rear end rib $80_1$, and a substantially U-shaped stopper wall 82 provided in adjacent behind the groove 81. The ribs 80 are opposed to the ribs 80 of the base portion 72, the groove 81 is opposed to the groove 81 of the base portion 72, and the stopper wall 82 is opposed to the stopper wall 82 of the base portion 72. The concave grooves 8*a* on the side of the outer periphery of the one end portion of the corrugated tube 8 are engaged with the ribs 80. The shaft 86 is turnably engaged with a bearing hole (not shown) of the cover member 63. The flanges 11 and 12 of the bending regulation members 1 to 7 of the embodiment illustrated in FIGS. 1 to 7 are engaged with the groove 81 (this configuration will be described later with reference to FIGS. 11 and 12).

The electricity-supply device 54 on the side of the slide door in FIG. 8 includes an oscillating member (inner, turning member or rotation body) (not shown) which is similar to the oscillating member in the electricity-supply device 52 on the side of the vehicle body, a support member 57 composed of a lower side base member and an upper side cover member

90. The support member 57 turnably supports the oscillating member in the horizontal direction. The electricity-supply device 54 also includes a guide cover 91 for leading a harness. The guide cover 91 is provided on an upper side of the upper side cover member 90. The support member 57 includes the vertical back wall 92, and the back wall 92 is fixed to a door inner panel 53 of the slide door through a screw.

Figure 11:
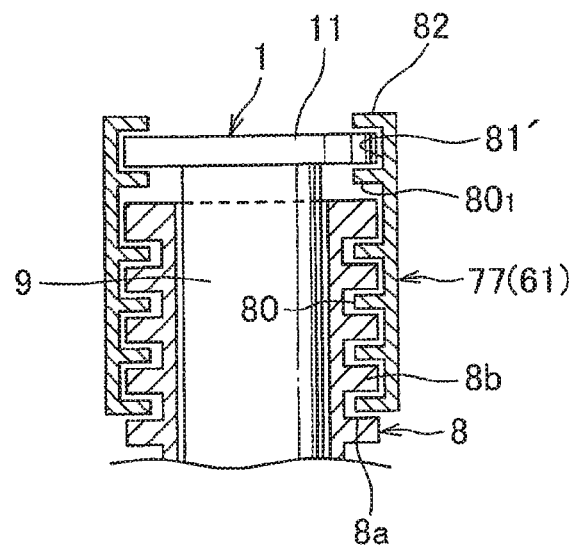
FIG. 11 is a sectional view illustrating one embodiment of an assembled structure of the inner member of the electricity-supply device, the corrugated tube and the harness bending regulation member.
Figure 12:
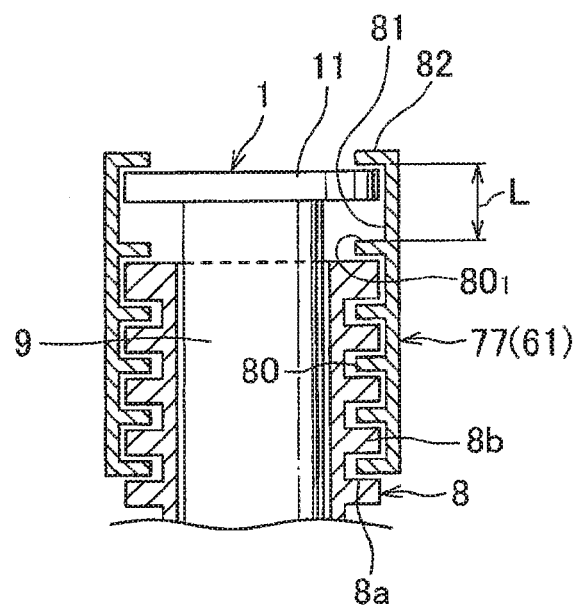
FIG. 12 is a sectional view illustrating another embodiment of the assembled structure of the inner member of the electricity-supply device, the corrugated tube and the harness bending regulation member.

FIGS. 11 and 12 illustrate embodiments (examples of structure) in which one end portion of the corrugated tube 8 and the flange 11 of the base end of the cylindrical portion 9 of the bending regulation member 1 (see embodiment illustrated in FIG. 1) are engaged with the corrugated tube holder 77 of the oscillating member 61 of the electricity-supply device 52 (FIG. 8) on the side of the vehicle body. The cylindrical portions 13, 16, 21, 29, 33 of the bending regulation members 2 to 7 in FIGS. 2 to 7 or the flanges 11 and 12 of the base end of the guttering portion 39 are also similarly engaged with the corrugated tube holder 77. FIGS. 11 and 12 only show the convex portion and concave portion 8a and 8b on the side of the outer periphery as the corrugated tube 8, and convex portions and concave portions on the side of the inner periphery are not illustrated in the drawings.

In the structure illustrated in FIG. 11, a width of the groove 81' of the rear end in the corrugated tube holder 77 of the oscillating member 61 is set small (slightly greater than thickness of flange 11 of base end of bending regulation member 1), and the flange 11 of the bending regulation member 1 is engaged with the groove 81' without axial play. Hence, the corrugated tube is reliably held by the bending regulation member, and the S-shaped bending shape of the corrugated tube exerts an effect to prevent the interference.

The groove 81' is formed narrow between the rib 80$_1$ of the rear end and the stopper wall 82, the ribs 80 are engaged with the concave grooves 8a on the side of the outer periphery of the corrugated tube 8, and the corrugated tube 8 is held and fixed so that the corrugated tube 8 does not move in the longitudinal direction (axial direction). The bending regulation member 1 is inserted into the corrugated tube 8 and is held by the oscillating member 61 such that the bending regulation member 1 does not move in the longitudinal direction and the circumferential direction. Since the corrugated tube 8 has the long circular cross section (having long-diameter portion in vertical direction), the corrugated tube 8 is held by the oscillating member 61 such that the corrugated tube 8 does not move in the longitudinal direction and the circumferential direction (this configuration is in common also in example illustrated in FIG. 12).

In the structure illustrated in FIG. 12, a width L (space in groove) of the groove 81 on the side of the rear end in the corrugated tube holder 77 of the oscillating member 61 is set large (width L is set sufficiently larger than thickness of flange 11 of base end of bending regulation member 1), and the flange 11 of the bending regulation member 1 is engaged with the groove 81 such that the flange 11 can move in the axial direction.

The groove 81 is formed wide between the rib 80$_1$ of the rear end and the stopper wall 82, the ribs 80 are engaged with the concave grooves 8a on the side of the outer periphery of the corrugated tube 8 and hold and fix the corrugated tube 8 such that the corrugated tube 8 does not move in the longitudinal direction (axial direction). The bending regulation member 1 is inserted into the corrugated tube 8, and is held (supported) by the oscillating member 61 such that the bending regulation member 1 can move in the longitudinal direction (axial direction) and does not move in the circumferential direction. The bending regulation member 1 can move (slide) in a given range in the axial direction inside between the corrugated tube 8 and the oscillating member 61.

According to the configuration illustrated in FIG. 12, when the slide door 53 halfway opens and the corrugated tube 8 bends into a front facing substantially U-shape with a small radius in FIG. 8 (bent portion is shown by reference sign 8h) and the spatulate portion 10 of the bending regulation member 1 is pushed rearward of the vehicle by the inner surface of the corrugated tube 8 for example and the bending regulation member 1 is slid rearward, the flange 11 abuts against the stopper wall 82 of the oscillating member 61 as illustrated in FIG. 12, the spatulate portion 10 strongly supports the inner surface 8f' of the front facing substantially U-shaped bent portion 8h of the corrugated tube 8, and the substantially U-shaped bending is reliably regulated. When the bending regulation member 1 is pulled forward of the vehicle by the inner surface of the corrugated tube 8 and the bending regulation member 1 slides forward in a range of the groove 81, an effective effect length (bending regulation length) of the spatulate portion 10 is increased, and the bending of the bent portion 8h of the corrugated tube 8 is reliably regulated.

Further, when the slide door 53 fully opens and the corrugated tube 8 is pulled rearward of the vehicle and bends with a large radius (bent portion is shown by reference sign 8n), the bending regulation member 1 is pulled outward of the vehicle (toward slide door 53) by a friction force between the bending regulation member 1 and the inner surface 8f' of the corrugated tube 8, and the bending regulation member 1 moves toward the slide door 53 in the corrugated tube 8 together with the cylindrical portion (unbendable portion) 9. According to this, the effective effect length (bending regulation length) of the cylindrical portion 9 is increased, the corrugated tube 8 largely separates outward from the vehicle body 51, and interference between the corrugated tube portion 8k and the vehicle body portion 51a is reliably prevented.

Even if a tensile force and a compression force in the axial direction caused by the friction with respect to the inner surface of the corrugated tube 8 are applied to the harness bending regulation member 1 when the corrugated tube 8 bends, the flange 11 of the base end of the harness bending regulation member 1 moves forward and backward in a range (width size L) of the groove 81 of the oscillating member 61, and the tensile force and the compression force are smoothly absorbed. These effects are exerted also when the other bending regulation members 2 to 7 are used.

Although the corrugated tube 8 is used as the harness protective tube in the above embodiments, it is also possible to use a soft mesh tube made of synthetic resin instead of the corrugated tube 8. In this case, an end of the mesh tube is held and fixed using a penetration projection or a grasping portion (not shown) instead of the ribs 80 of the tube holder 77 of the oscillating member 61.

Figure 13:
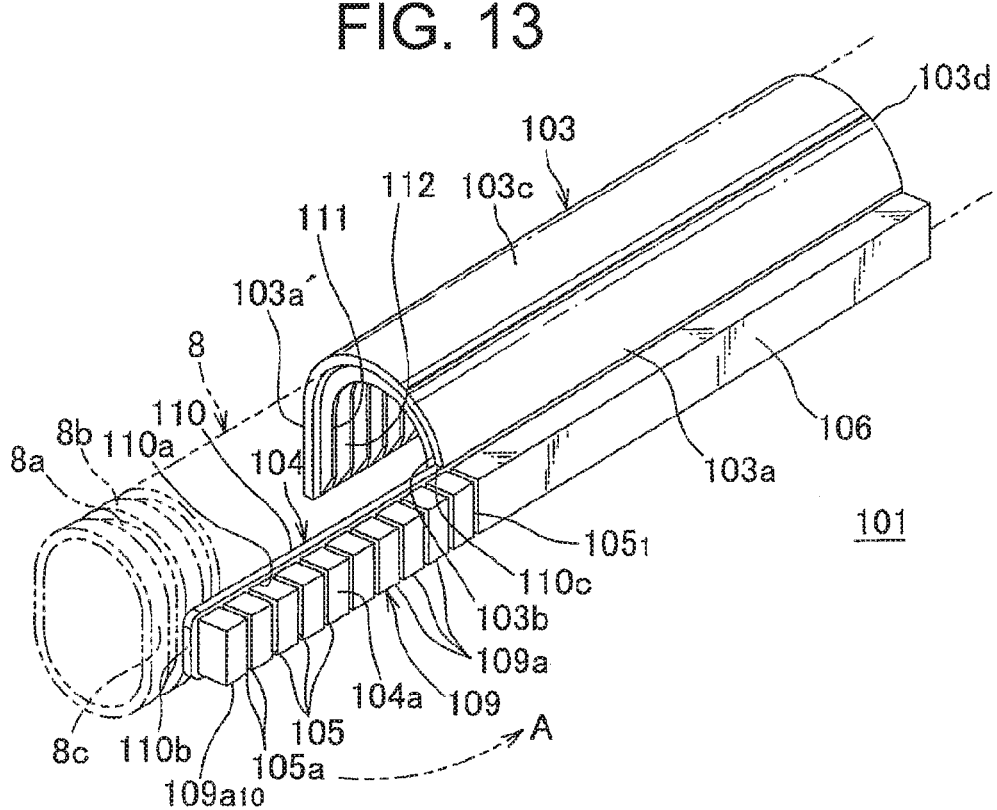
FIG. 13 is a perspective view illustrating an eighth embodiment of the harness bending regulation member of the invention.
Figure 17:
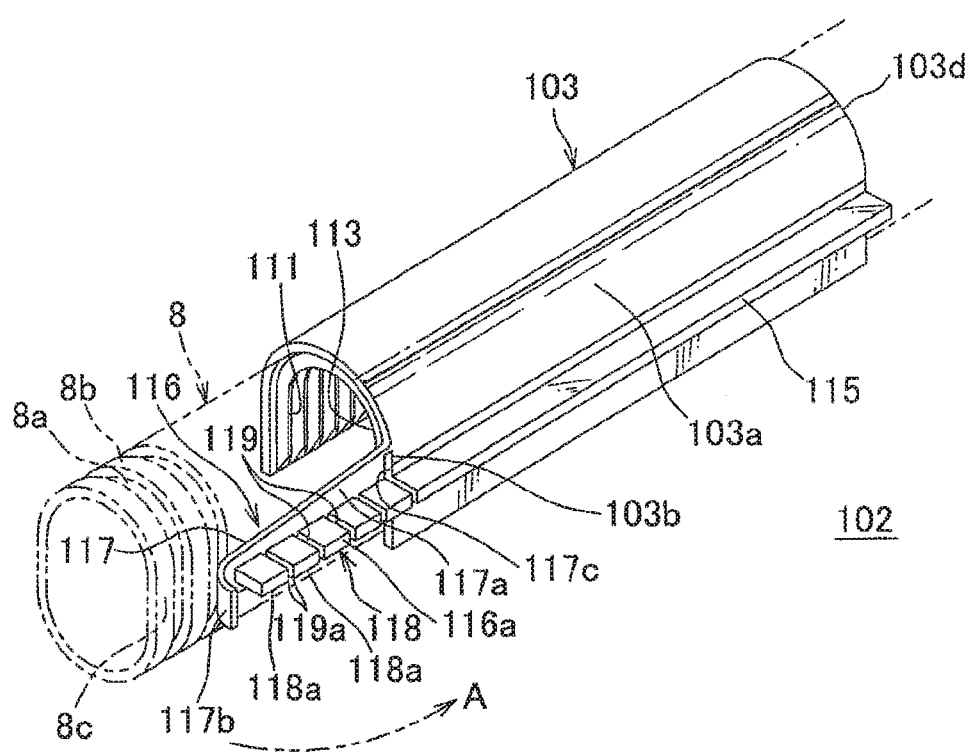
FIG. 17 is a perspective view illustrating a ninth embodiment of the harness bending regulation member.

FIGS. 13 and 17 illustrate other embodiments of harness bending regulation members of the present invention.

These harness bending regulation members 101 and 102 are attached to outside of the corrugated tube (harness protective tube) 8 made of synthetic resin. Each of the harness bending regulation members 101 and 102 is made of synthetic resin, and has a cross section shape corresponding to the corrugated tube 8 having a long circular cross section. The corrugated tube 8 is an existing tube in which circumferential concave grooves 8a and convex projections 8b (FIG. 13) are arranged alternately in the longitudinal direction of the tube.

The harness bending regulation member 101 illustrated in FIGS. 13 to 16 includes a high rigid guttering portion (unbendable portion or high rigid portion) 103 having a reversed substantially U-shaped cross section as illustrated in FIG. 13, and a flexible projection (bendable portion or low rigid portion) 104 which integrally extends in the axial direction (longitudinal direction) from a tip end side 103b of the guttering portion 103 in one side (one side wall) 103a on the short-diameter side of the guttering portion 103. The projection 104 includes a plurality of vertical slits 105 on the side of an outer surface 104a. The slits 105 are arranged in parallel.

The guttering portion 103 includes an upper side arc portion 103c, and side walls 103a and 103a' hanging from right and left sides of the arc portion 103c. A thick projection wall 106 having a vertical rectangular cross section is integrally provided on the one side wall 103a, the projection wall 106 straightly extends in the axial direction (forward) from a tip end 103b of the guttering portion 103 to form the projection wall 109, and a flexible support plate (connection plate) 110 is integrally provided on the inner surface side of the projection wall 109. The support plate 110 is wider than the projection wall 109 in the vertical direction and is thin in inner and outer directions.

The projection wall 109 is provided with the plurality of vertical slits 105 in parallel (parallel) in the longitudinal direction of the projection wall 109 with an equal pitch, the slits 105 are formed by notching from an outer surface 104a of the projection wall 109 to an outer surface 110a of the support plate 110, the projection wall 109 is formed into rectangular blocks between the slits 105, and the projection wall 109 formed from the rectangular blocks 109a, the slits 105 and the support plate 110 configure a flexible projection (bendable portion) 104.

An inner width of the slit 105 is defined as small as about ¼ of a longitudinal width of each of the blocks 109a. The slit 105 may be called a groove. Opposed inner surfaces of the adjacent blocks 109a form front and rear end surfaces (opposed inner surfaces 105a) of the slits 105. By appropriately setting the inner width size of the slit 105, it is possible to appropriately define a bending radius of the projection 104 in the direction of the arrow A.

When the corrugated tube 8 bends in the direction of the arrow A, the flexible projection 104 is pushed by the outer surface of the one side 8c of the corrugated tube 8, and the projection 104 bends toward the outer surface 104a (direction). When the projection 104 bends to some extent, the opposed inner surfaces 105a of the slits 105 of the projection 104, i.e., opposed inner surfaces of the adjacent blocks 109a abut against each other, thereby preventing the projection 104 from further bending. The corrugated tube and the plurality of electric wires inserted into an inner space thereof configure the wire harness.

A projecting length of the projection 104 in this example is defined slightly shorter than a length of the guttering portion 103. One $105_1$ of the slits 105 on the side of the base end is located on the same plane as that of the tip end 103b of the guttering portion 103. A thickness of the block 109a in this example is about four times of a thickness of the support plate 110. The tip end 110b of the support plate 110 projects slightly forward of a top block $109a_{10}$, and upper and lower ends of the support plate 110 in the width direction project slightly more than the block 109a in upper and lower directions. The base end 110c of the support plate 110 is continuous with a tip end surface 103b of the guttering portion 103.

A plurality of projections 111 projecting more inward than the tip end surface 103b of the guttering portion 103 are provided in parallel on the inner surface of the guttering portion 103, and grooves 112 are formed between the projections 111. Each of the projections 111 is formed into a substantially reversed U-shape along the inner peripheral surface of the guttering portion 103. The projections 111 are engaged with the concave grooves 8a of the corrugated tube 8, and position and hold the harness bending regulation member 101 outside the corrugated tube 8 such that the harness bending regulation member 101 does not move in the axial direction. The corrugated tube 8 has the long circular cross section and the guttering portion 103 has the reversed U-shaped cross section. Therefore, the harness bending regulation member 101 does not move in the circumferential direction of the corrugated tube 8 either.

To completely fix the harness bending regulation member 101 to the corrugated tube 8, it is possible to fasten the guttering portion 103 to the corrugated tube 8 through adhesive tape winding or banding band (not shown). It is preferable that the guttering portion 103 is put on the corrugated tube 8 from above because operability is more excellent and it is possible to prevent the guttering portion 103 from falling and deviating in the vertical direction as compared with a case where the guttering portion 103 is put on the corrugated tube 8 from below. It is preferable that a tip end portion of the projection 104 is fixed to the corrugated tube 8 through tape winding to enhance the restoring force of the projection 104 in a direction opposite from the arrow A.

The projection wall 106 provided on the one side wall 103a of the guttering portion 103 enhances the bending rigidity of the one side wall 103a of the guttering portion 103. When the one side wall 103a has sufficient rigidity, it is also possible to employ such a configuration that the long projection wall 106 is eliminated, a short projection wall (106) is formed in the vicinity of the tip end 103b of the one side wall 103a, and the flexible projection wall 109 is extended forward from the short projection wall (106).

Figure 14:
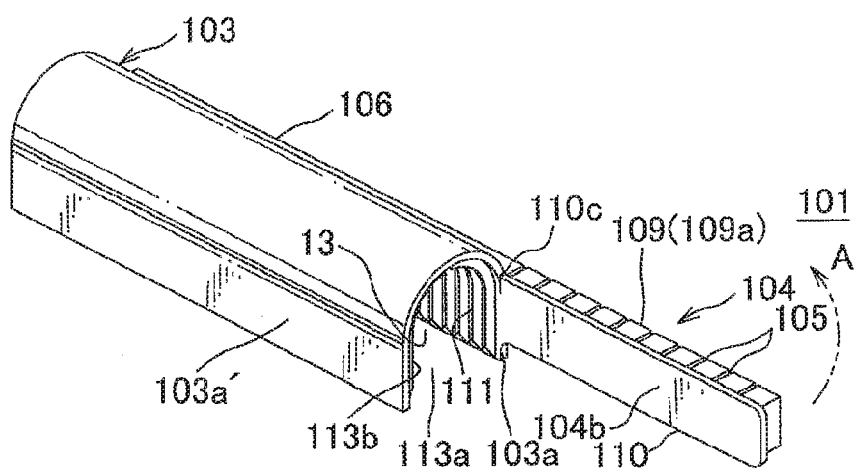
FIG. 14 is a perspective view of the harness bending regulation member as viewed from the opposite direction.

As illustrated in FIG. 14, a support plate (connection plate) 110 of the projection 104 includes a flat inner surface 104b. The inner surface 104b is located on the same plane as that of the inner surface of the one side wall 103a of the guttering portion 103 in the base end 110c of the support plate 110. The inner surface of the guttering portion 103 is provided with the plurality of projections 111.

Figure 15:
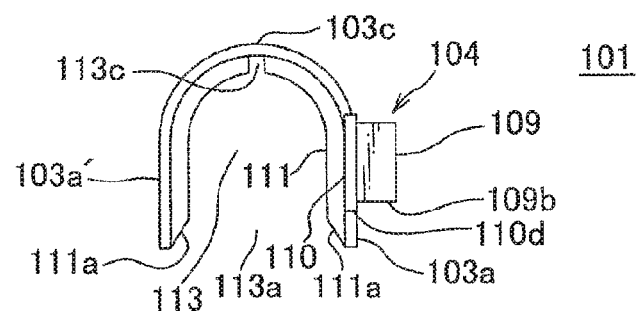
FIG. 15 is a front view of the harness bending regulation member.

As illustrated in FIGS. 14 and 15, the one side wall 103a and the other one side wall 103a' of the guttering portion 103 are parallel to each other, and heights of both the side walls 103a and 103a' are the same. A laterally long lower opening 113a, a corrugated tube accommodation space 113 which is continuous with an upper side of the lower opening 113a, and front and rear reversed U-shape openings 113b of the corrugated tube accommodation space 113 are formed between both the side walls 103a and 103a'.

As illustrated in FIG. 15, lower ends of the projections 111 in both the side walls 103a and 103a' of the guttering portion 103 incline in a tapered form, and form an insertion guide surface 111a with respect to the concave grooves 8a of the corrugated tube 8 (FIG. 13). A lower end 109a of the projection wall 109 projecting forward from the tip end of the one side wall 103a and a lower end 110d of the support plate 110 are located higher than the lower end 111a of the one side wall 103a, and central portions of the projection wall 109 (plurality of blocks 109a) and the support plate 110 in the height direction are placed at the same height as that of a center axis of the corrugated tube 8 (FIG. 13) held in the guttering portion 103.

Figure 16:
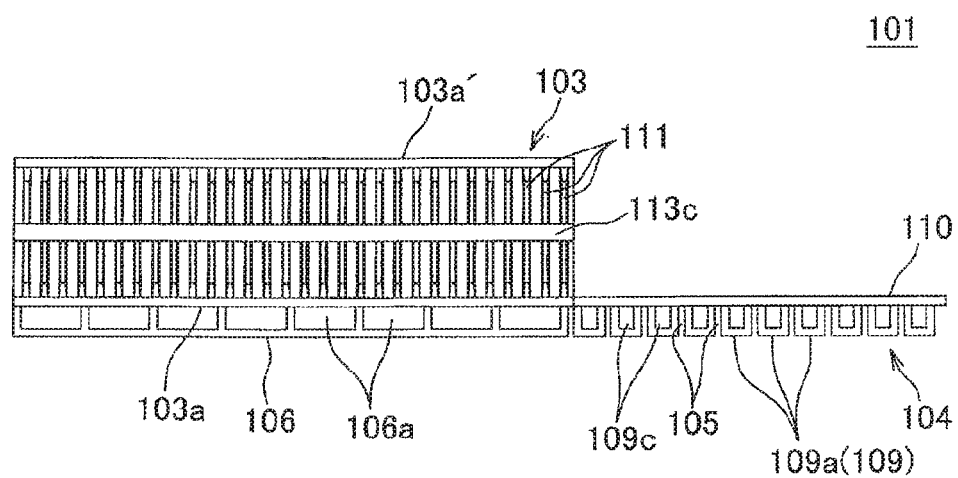
FIG. 16 is a plan view (bottom view) illustrating an inner side of the harness bending regulation member.

As illustrated in FIGS. 15 and 16, the projections 111 on the side of the inner surface of the arc upper wall 103c of the guttering portion 103 are provided, in the axial direction, with a groove 113c with which a rib (not shown) is engaged. This rib is for preventing the upper end of the upper and lower ends of the corrugated tube 8 (FIG. 13) from hanging down. When there is not rib for preventing the upper end from hanging down, the groove 113c is unnecessary.

As illustrated in FIG. 16 (bottom view), the projection wall 106 extending along the one side wall 103a of the guttering portion 103, and the plurality of blocks 109a forming the flexible projection wall 109 projecting forward from the projection wall 106 are formed with hollow portions 106a and 109c which open downward, and the projection wall 106 and the blocks 109a are reduced in weight. Directions such as the vertical direction and the longitudinal direction used in the description (specification) are described for the sake of convenience of explanation.

A harness bending regulation member 102 illustrated in FIG. 17 is different from the harness bending regulation member 101 illustrated in FIG. 13 in a shape of the projection wall 115 extending along the one side wall 103a of the guttering portion 103, and a shape of the flexible projection 116 projecting in the axial direction from the tip end 103b of the one side wall 103a. Since other configurations of the guttering portion 103 and the corrugated tube 8 are the same as those illustrated in FIG. 13, detailed description thereof will be omitted.

As illustrated in FIG. 17, the projection wall 115 extending along the one side wall 103a of the guttering portion 103 has a vertical thickness smaller than a width of the projection wall 115 in the lateral direction, and the projection wall 115 forms a horizontal projection plate. The projection 116 projecting in the axial direction from the tip end 103b of the one side wall 103a is composed of a flexible support plate (connection plate) 117 which is formed thinner than the one side wall 103a and which projects forward from the tip end surface 103b of the one side wall 103a, a plurality of rectangular blocks 118a which extend forward from the projection wall 115 of the one side wall 103a of the guttering portion 103 with the same thickness and the same width, and which is integrally provided on an outer surface 117a of the support plate 117, and a flexible projection wall 118 including slits 119 between the blocks 118a.

The projection 116 of the example is formed shorter than the projection 104 illustrated in FIG. 13 and regulates the bending in a relatively short range of the corrugated tube 8 and therefore, the projection 116 is effective. The support plate 117 is tapered such that a vertical width thereof is gradually reduced toward its tip end. According to this, a tip end portion 117b (front half) of the support plate 117 is prone to bend with a smaller radius than a base end 117c (rear half) of the support plate 117.

The tip end portion 117b of the support plate 117 curves outward, and projects outward by the same length as the blocks 118a or by a longer length than the blocks 118a. The tip end portion 117b functions as a guide (117b) when the projection 116 is inserted over the tip end portion 117b in the axial direction along an outer surface of the one end portion 8c of the corrugated tube 8, and when the corrugated tube 8 is bent in the direction of the arrow A (toward outer surface 116a of projection 116), the one end portion 8c of the corrugated tube 8 does not interfere with the tip end of the support plate 117 and is not damaged.

A vertical width of the support plate 117 is defined sufficiently larger than a vertical width (thickness) of the block 118a, and a flat inner surface of the support plate 117 comes into contact with an outer surface of the one end portion 8c of the corrugated tube 8 with a large area. A width of the block 118a in the projecting direction and a width of the block 118a in the longitudinal direction are defined sufficiently larger than the vertical width (thickness) of the block 118a, and a distance (inner width) between the opposed front and rear inner surfaces 119a of the slits 119 between the blocks 118a, i.e., a distance (119) between the adjacent blocks 118a is defined sufficiently smaller than a longitudinal width of the block 118a.

By appropriately setting the inner width of the slit 119, it is possible to appropriately define the bending radius of the projection 116. For example, it is also possible to bend a front half of the projection 116 with a smaller radius than a rear half of the projection 116 by reducing the inner width of the slit 119 close to the base end 117c (rear half) of the projection 116, or by increasing the inner width of the slit 119 close to the tip end portion 117b (front half), or by gradually increasing the inner width of the slit 119 from the base end 117c toward the tip end portion 117b of the projection 116. This configuration is the same also in the projection 104 of the embodiment illustrated in FIG. 13.

A depth of the corrugated tube accommodation (insertion) space 113 inside the guttering portion 103 is defined larger than a half (half radius) of a long-diameter of the corrugated tube 8 having the long circular cross section, and the projection 116 projects along a center axis of the corrugated tube 8 from the tip end 103b of the one side wall 103a of the guttering portion 103. The inner surface of the guttering portion 103 is provided with a plurality of substantially reversed U-shaped ribs 111 in parallel with an equal pitch. The ribs 111 engage with the concave grooves 8a of the corrugated tube 8.

Figure 18:
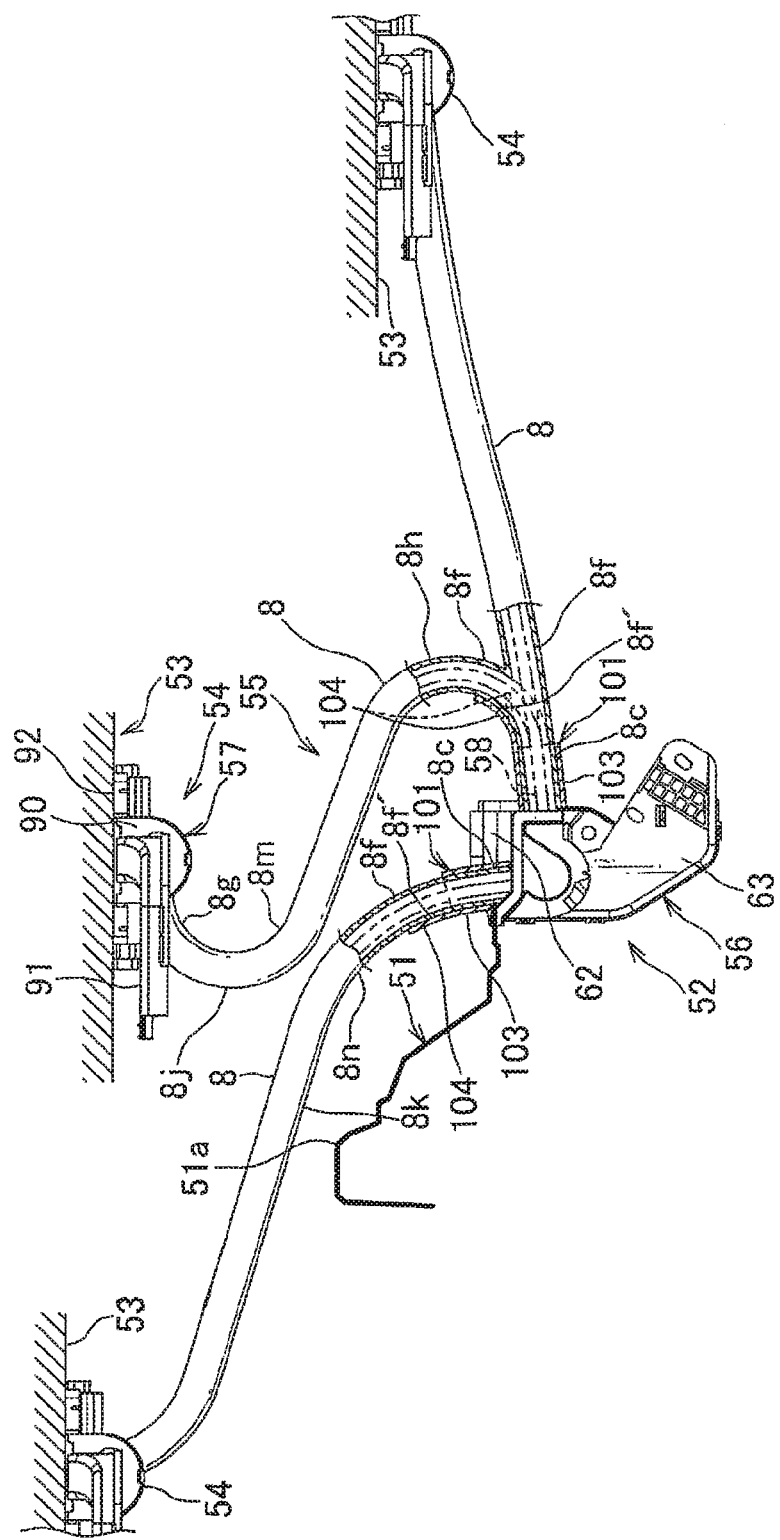
FIG. 18 is a plan view illustrating a second embodiment of the harness routing structure using the harness bending regulation member of the invention.

FIG. 18 illustrates another embodiment of the harness routing structure using the harness bending regulation member of the present invention. In the following description, a bending regulation member 101 illustrated in FIG. 13 is used as the harness bending regulation member for the sake of convenience.

According to this harness routing structure, a wire harness 55 is routed from an electricity-supply device 52 on the side of a vehicle body (fixing structure) 51 of a car to an electricity-supply device 54 on the side of a slide door (slide structure) 53. In FIG. 18, a fully closed state of the slide door 53 is shown by solid lines in a right drawing, a halfway opened state of the slide door 53 is shown by solid lines in a middle drawing, and a fully opened state of the slide door 53 is shown by solid lines in a left drawing for the sake of convenience. The slide door 53 opens from a front side toward a rear side of the vehicle.

At an initial opening stage of the slide door 53, it separates outward of the vehicle from a platform of the vehicle body 51. The electricity-supply devices 52 and 54 are composed of oscillating members (not shown) which can oscillate in the horizontal direction and support members 56 and 57 which support the oscillating members. Ends 8c and 8g of the corrugated tube (harness protective tube) 8 on the side of an outer periphery of the wire harness 55 are held by the oscillating members of the electricity-supply devices 52 and 54. The wire harness 55 is composed of the corrugated tube 8 and a plurality of electric wires 58 inserted into the corrugated tube 8. In FIG. 18, a reference sign 51 represents a lower rear portion of a step portion of the platform of the vehicle body and a reference sign 53 represents a door inner panel of the slide door.

The harness bending regulation member 101 is fitted over the corrugated tube 8 on the side of the electricity-supply device 52 on the side of the vehicle body, the guttering portion (unbendable portion) 103 of the bending regulation member 101 is placed on the one end portion 8c of the corrugated tube 8, and the projection (bendable portion) 104 is placed along the outer side (when door is fully closed) of the vehicle or a rear side of the vehicle (when door halfway opens and fully opens) in the intermediate portion 8f in the longitudinal direction which is continuous with the one end portion 8c of the corrugated tube 8, i.e., along the outer surface of the bent inner side of the corrugated tube 8.

As shown in the right drawing in FIG. 18, when the slide door 53 fully closes, the corrugated tube 8 of the wire harness 55 is routed in a state where the corrugated tube 8 is substantially straightly extended from the electricity-supply device 52 on the side of the vehicle body to the electricity-supply device 54 on the side of the slide door. The projection 104 of the bending regulation member 101 is substantially straightly located along the corrugated tube 8.

As shown in the middle drawing in FIG. 18, when the slide door 53 halfway opens, the guttering portion 103 of the bending regulation member 101 prevents the corrugated tube 8 from bending, the inner surface 104b (FIG. 14) of the projection 104 is pushed by the outer surface of the rear side of the vehicle of the corrugated tube portion 8f close to the electricity-supply device 52 on the side of the vehicle body, the projection 104 is bent in a curved manner outward of the vehicle, and the corrugated tube portion 8f close to the electricity-supply device 52 on the side of the vehicle body is bent forward in a substantially U-shape (bent portion is shown by reference sign 8h) together with the projection 104. That is, the projection 104 regulates the bending of the corrugated tube portion 8f in the curved shape (further bending of corrugated tube portion 8f is prevented). According to this, the corrugated tube portion close to the electricity-supply device 54 on the side of the slide door bends rearward in the substantially U-shape (bent portion is shown by reference sign 8j), and the corrugated tube 8 smoothly bends in a substantially S-shape as a whole.

When the slide door 53 is opened from its fully closed state, the corrugated tube portion close to the electricity-supply device 52 on the side of the vehicle body is restrained from bending (8h) by the guttering portion 103 of the bending regulation member 101, and the corrugated tube portion is maintained in a state where it extends substantially straightly (bending is regulated).

The substantially U-shaped rear facing bent portion 8j of the corrugated tube portion 8m close to the electricity-supply device 54 on the side of the slide door is formed, the front facing substantially U-shaped bent portion 8h of the corrugated tube portion 8f close to the electricity-supply device 52 on the side of the vehicle body is restrained from bending into the curved shape by the projection 104 of the bending regulation member 101, the minimum bending radius of the corrugated tube 8 is secured between the electricity-supply devices 52 and 54, and the corrugated tube 8 smoothly bends in the substantially S-shape without buckling. According to this, bending endurance of the corrugated tube 8 and the plurality of electric wires 58 inserted into the corrugated tube 8 (wire harness 55) is enhanced. When the slide door 53 fully closes and halfway opens, turning motion of the oscillating member (not shown) of both the electricity-supply devices 52 and 54 is very small.

As shown in the left drawing in FIG. 18, when the slide door 53 fully opens, the electricity-supply device 54 on the side of the slide door is located rearward of the electricity-supply device 52 on the side of the vehicle body, the oscillating member of the electricity-supply device 52 on the side of the vehicle body turns rearward in the counterclockwise directly and stops, the oscillating member of the electricity-supply device 54 on the side of the slide door turns forward in the counterclockwise directly from back, and the corrugated tube 8 is pulled rearward between both the electricity-supply devices 52 and 54. The wire harness 55 oscillates from the front side to the rear side of the vehicle around the electricity-supply device 52 on the side of the vehicle body as a fulcrum between the vehicle body 51 and the slide door 53.

When the slide door 53 fully opens, the longitudinally intermediate portion 8k of the corrugated tube 8 is prone to interfere with the lower rear end 51a of the platform of the vehicle body 51 (electricity-supply device 52 on the side of the vehicle body is placed below or in the vicinity of step portion of platform), the inner surface of the guttering portion 103 of the bending regulation member 101 abuts against the outer surface of the one end portion 8c of the corrugated tube 8 close to the electricity-supply device 52 on the side of the vehicle body, the one end portion 8c of the corrugated tube 8 is restrained from straightly extending rearward of the vehicle, and the one end portion 8c of the corrugated tube 8 is projected in the thickness direction of the slide door outward the vehicle from the electricity-supply device 52 on the side of the vehicle body.

According to this, the corrugated tube portion 8f which is continuous with the one end portion 8c separates outward from the vehicle body 51, and this prevents the longitudinally intermediate portion 8k of the corrugated tube 8 and the lower rear end 51a of the platform of the vehicle body 51 from interfering with each other. According to this, the corrugated tube 8 is prevented from being worn and damaged, and the plurality of electric wires 58 routed inside the corrugated tube 8 are safely protected. The projection 104 of the bending regulation member 101 does not abut against the inner surfaces 5a of the slits 5 (FIG. 13), and the projection 104 bends with a large radius together with the corrugated tube portion 8f (bent portion of corrugated tube is shown by reference sign 8n).

Especially when the slide door 53 halfway opens, since the bending regulation member 101 has the high rigid guttering portion (unbendable portion) 103 and the flexible projection (bendable portion) 104, the corrugated tube 8 can be restrained from bending in the quadratic curve manner by the projection 104 as compared with a case where a bending regulation member (not shown) having only the guttering portion 103 is used, and it is possible to prevent the corrugated tube 8 from being folded.

Although the bending regulation member 101 illustrated in FIG. 13 is used in FIG. 18, the same effect can be exerted by the projection 104 even if the bending regulation member 102 in FIG. 17 is used. To enhance the contact positional precision between the projections 104 and 116 and the corrugated tube 8 in the embodiments, it is also possible to band and hold the slits 105 and 119 of the projections 104 and 116 and the concave grooves 8a of the corrugated tube 8 through thin banding bands (not shown).

The configuration of the electricity-supply device 52 on the side of the vehicle body and the configurations of the oscillating member 61 and the support member 56 of the electricity-supply device 52 in FIG. 18 are the same as those of the embodiments illustrated in FIGS. 9 and 10 and hence, description thereof will be omitted. The base end 103d of the guttering portion 103 of the harness bending regulation member 101, 102 (FIGS. 13 and 17) comes into contact with or approaches along a reversed U-shaped opening 77a of the corrugated tube holder 77 illustrated in FIG. 10.

Although the corrugated tube 8 is used as the harness protective tube in the embodiment illustrated in FIG. 18, it is also possible to use a soft synthetic resin mesh tube instead of the corrugated tube 8 for example. In this case, the end of the mesh tube is held and fixed using a penetrating projection or a grasping portion (not shown) instead of the ribs 80 of the tube holder 77 of the oscillating member 61 (FIG. 10).

Features of the harness bending regulation members 101 and 102 illustrated in FIGS. 13 to 18 and features of the harness routing structure using the same will collectively be described below.

Firstly, the harness bending regulation member 101, 102 is fitted over the flexible harness protective tube 8, and includes the high rigid unbendable portion 103 which is put on the harness protective tube 8, and a bendable portion 104, 116 which projects in an axial direction from the tip end of the unbendable portion 103 and regulates the bending of the harness protective tube 8 into the curved shape.

According to this configuration, when a bending force is applied to the harness protective tube 8, the unbendable portion 103 of the harness bending regulation member 101, 102 comes into contact with the outer surface of the end of the harness protective tube 8 for example, and regulates the bending of the end straightly for example, and the bendable portion 104, 116 which is continuous with the unbendable portion 103 comes into contact with the outer surface of a portion of the harness protective tube 8 which is continuous with the end, and regulates the bending thereof into a curved shape.

The unbendable portion 103 of the harness bending regulation member 101, 102 and the bendable portion 104, 116 which is continuous with the unbendable portion 103 regulate the bending of the harness protective tube 8 of the wire harness, and can smoothly bend the harness protective tube 8 without folding the same. According to this, it is possible to smoothly and reliably regulate the bending of the harness protective tube 8 without damaging the harness protective tube 8 such as the corrugated tube.

Secondly, the bendable portion 104, 116 of the harness bending regulation member 101, 102 includes the plurality of slits 105, 119 or grooves on the side of the outer surface arranged in parallel, and the opposed inner surfaces of the slits 105, 119 or grooves abut against each other and regulate the bending.

According to this configuration, when the bendable portion 104, 116 bends toward the outer surface (on the side of outer surface), the opposed inner surfaces of the slits 105, 119 or grooves abut against each other, and the bendable portion 104, 116 is prevented from further bending. When the bendable portion 104, 116 bends toward the inner surface (on the side of inner surface), the slits 105, 119 or the grooves open. Therefore, the bendable portion 104, 116 can bend with a smaller bending radius than that of a case where the bendable portion 104, 116 bends toward the outer surface.

When the bendable portion 104, 116 bends toward the outer surface, the opposed inner surfaces of the slits 105, 119 or grooves abut against each other, and it is possible to prevent the bendable portion 104, 116 from further bending.

Thirdly, the unbendable portion 103 of the harness bending regulation member 101, 102 is formed into the shape of a gutter which is deeper than the radius of the harness protective tube 8, and the bendable portion 104, 116 is placed at a position corresponding to a center axis of the harness protective tube 8.

According to this configuration, the harness protective tube 8 is easily inserted (inserted and attached) in an axial direction into the guttering-shaped unbendable portion 103 from the laterally long opening thereof, and the harness protective tube 8 is reliably held by the unbendable portion 103 which is deeper than the radius of the harness protective tube 8. The unbendable portion 103 covers the harness protective tube 8 up to a position deeper than its radius, and reliably prevents the harness protective tube 8 from bending. The bendable portion 104, 116 is placed along the center axis of the harness protective tube 8, reliably receives the bending force of the harness protective tube 8, and reliably regulates the bending.

The harness bending regulation member 101, 102 can easily be attached to the harness protective tube 8, and the unbendable portion 103 which is deeper than the radius of the harness protective tube 8 and the bendable portion 104, 116 corresponding to the center axis of the harness protective tube 8 can smoothly and reliably regulate the bending of the harness protective tube 8.

Fourthly, the plurality of projections 111 which engage with the plurality of concave grooves 8a arranged in parallel in the circumferential direction of the corrugated tube which is the harness protective tube 8 are provided on the inner surface of the unbendable portion 103 of the harness bending regulation member 101, 102.

According to this configuration, the parallel projections 111 on the inner surface of the unbendable portion 103 are engaged with the parallel concave grooves 8a of the corrugated tube 8, the corrugated tube portion inside the unbendable portion 103 is reliably prevented from bending, extending and shrinking in the axial direction, and the unbendable portion 103 is strongly held by the corrugated tube 8 such that the unbendable portion 103 does not move in the axial direction (when corrugated tube 8 has long circular cross section, unbendable portion 103 does not move in circumferential direction either). The corrugated tube 8 is a flexible existing harness protective tube having a circular or long circular cross section including the circumferential concave grooves 8a and the circumferential convex projections 8b arranged in parallel in the longitudinal direction of the tube.

It is possible to strongly hold the unbendable portion 103 of the harness bending regulation member 101, 102 by the corrugated tube 8 such that the unbendable portion 103 does not move in position at least in the axial direction. According to this, it is possible to reliably regulate the bending of the necessary portion of the corrugated tube 8.

Fifthly, as the harness routing structure, the harness protective tube 8 is routed in the oscillating member on the side of the slide door 53 from the oscillating member 61 on the side of the a fixing structure 51, the harness bending regulation member 101, 102 is attached to the outside of the harness protective tube 8 on the side of the fixing structure, and the bendable portion 104, 116 is placed toward the slide structure along the outer surface of the harness protective tube 8.

According to this configuration, when the slide door 53 opens from its fully closed state, the harness bending regulation member 101, 102 substantially straightly maintains the harness protective tube 8 on the side of the fixing structure 51 to regulate the bending, and when the slide door 53 halfway opens, the harness protective tube 8 on the side of the fixing structure is supported by the bendable portion 104, 116 of the harness bending regulation member 101, 102 and the minimum bending radius is secured, the bending is regulated in the curved shape without buckling or folding, and the harness protective tube 8 is smoothly bent substantially in the S-shape between both the oscillating members 61.

When the slide door 53 fully opens from the halfway opened state, the harness protective tube 8 is pulled and extended between both the oscillating members 61 and the harness protective tube 8 tries to interfere with a portion of the fixing structure 51, but the bending of the harness protective tube 8 on the side of the fixing structure is straightly regulated by the unbendable portion 103 of the harness bending regulation member 101, 102, and the harness protective tube 8 projects in the thickness direction of the slide door 53 and according to this, interference between the harness protective tube 8 and the fixing structure 51 is prevented.

When the slide door 53 halfway opens, the minimum bending radius of the wire harness having the harness protective tube is secured by the harness bending regulation member 101, 102 between the slide door 53 and the fixing structure 51, the bending of the wire harness is smoothly regulated without buckling, and it is possible to enhance the bending endurance of the wire harness, to prevent the interference between the harness protective tube 8 and the fixing structure 51 when the slide door 53 fully opens, and to always enhance the reliability of the supply of electricity to the slide door 53.

INDUSTRIAL APPLICABILITY

The harness bending regulation member and the harness routing structure using the same according to the present invention can be utilized for such purposes that bending of a protective tube such as a corrugated tube is smoothly and reliably regulated without damaging the protective tube and according to this, a minimum bending radius of the wire harness having the protective tube is secured between a slide structure and a fixing structure, the wire harness is smoothly bent without buckling, bending endurance of the wire harness is enhanced, and interference between the protective tube and the fixing structure is prevented.

REFERENCE SIGN LIST 1 to 7 harness bending regulation member
8 corrugated tube (harness protective tube)
9, 13, 16, 21, 29, 33 cylindrical portion (unbendable portion)
10, 14, 22, 34 spatulate portion (bendable portion)
11, 12 flange
15, 18, 35, 43, 44 slits
17 rib (bendable portion)
23, 45 projection
30 projection plate (bendable portion)
32 groove
38 guttering portion (unbendable portion)
39 connection wall (bendable portion)
40c, 44a inner surface
46 projection
51 vehicle body (fixing structure)
53 slide door (slide structure)
58 electric wire
61 oscillating member
81 groove

The invention claimed is:

1. A harness bending regulation member inserted into a flexible harness protective tube, the member comprising:
   a high rigid unbendable portion into which an electric wire is inserted; and
   a bendable portion projecting in an axial direction of the harness bending regulation member from a tip end of one side of the unbendable portion, the bendable portion regulating a bending of the harness protective tube in a curved shape from inside of the harness protective tube.

2. The harness bending regulation member according to claim 1, wherein the bendable portion includes a plurality of slits or grooves arranged in parallel.

3. The harness bending regulation member according to claim 2, wherein projections are provided on end edges of the slits or the grooves, and deviation between opposed inner surfaces of the slits or the grooves generated when the inner surfaces abut against each other is absorbed by the projections.

4. A harness routing structure in which a harness protective tube is routed from an oscillating member on a side close to a fixing structure to another oscillating member on a side close to a slide structure, the harness bending regulation member according to claim 3 is placed in a harness holding tube on the side of the fixing structure, and the bendable portion is placed toward the slide structure along the harness protective tube.

5. The harness routing structure using the harness bending regulation member according to claim 4, wherein a flange on a side close to a base end of the unbendable portion is axially movably engaged with a groove of the oscillating member on the side of the fixing structure.

6. A harness routing structure in which a harness protective tube is routed from an oscillating member on a side close to a fixing structure to another oscillating member on a side close to a slide structure, the harness bending regulation member according to claim 2 is placed in a harness holding tube on the side of the fixing structure, and the bendable portion is placed toward the slide structure along the harness protective tube.

7. The harness routing structure using the harness bending regulation member according to claim 6, wherein a flange on a side close to a base end of the unbendable portion is axially movably engaged with a groove of the oscillating member on the side of the fixing structure.

8. A harness routing structure in which a harness protective tube is routed from an oscillating member on a side close to a fixing structure to another oscillating member on a side close to a slide structure, the harness bending regulation member according to claim 1 is placed in a harness holding tube on the side of the fixing structure, and the bendable portion is placed toward the slide structure along the harness protective tube.

9. The harness routing structure using the harness bending regulation member according to claim 8, wherein a flange on a side close to a base end of the unbendable portion is axially movably engaged with a groove of the oscillating member on the side of the fixing structure.

10. The harness bending regulation member according to claim 1, wherein the bendable portion is a spatulate portion.

* * * * *